United States Patent
Iwasaki et al.

[11] Patent Number: 6,137,710
[45] Date of Patent: Oct. 24, 2000

[54] CONNECTING APPARATUS, AND INFORMATION PROCESSING APPARATUS

[75] Inventors: Hiroshi Iwasaki, Yokohama; Toshio Yajima, Funabashi, both of Japan

[73] Assignee: Kabushiki Kaisha Toshiba, Kawasaki, Japan

[21] Appl. No.: 09/395,766

[22] Filed: Sep. 14, 1999

Related U.S. Application Data

[63] Continuation of application No. 09/030,856, Feb. 26, 1998.

[30] Foreign Application Priority Data

Feb. 28, 1997 [JP] Japan .................................. P9-046318
Feb. 25, 1998 [JP] Japan .................................. P10-043913

[51] Int. Cl.[7] .................................................... G11C 5/02
[52] U.S. Cl. ........................................ 365/52; 235/380
[58] Field of Search ............................. 235/380, 382; 380/4, 20; 365/51, 52, 63

[56] References Cited

U.S. PATENT DOCUMENTS

| | | | |
|---|---|---|---|
| 4,264,917 | 4/1981 | Ugon | 257/668 |
| 4,703,420 | 10/1987 | Irwin | 710/113 |
| 4,752,677 | 6/1988 | Nakano et al. | 235/380 |
| 4,752,678 | 6/1988 | Rikuna | 235/380 |
| 4,837,628 | 6/1989 | Sasaki | 348/220 |
| 4,882,702 | 11/1989 | Struger et al. | 365/226 |
| 4,916,662 | 4/1990 | Mizuta | 365/52 |
| 4,943,464 | 7/1990 | Gloton et al. | 428/76 |
| 4,959,788 | 9/1990 | Nagata et al. | 235/380 |
| 4,980,856 | 12/1990 | Ueno | 361/684 |
| 5,018,017 | 5/1991 | Sasaki et al. | 348/232 |
| 5,036,429 | 7/1991 | Kaneda et al. | 361/686 |
| 5,091,618 | 2/1992 | Takahashi | 235/441 |
| 5,153,818 | 10/1992 | Mukougawa et al. | 361/737 |
| 5,155,663 | 10/1992 | Harase | 361/684 |
| 5,172,338 | 12/1992 | Mehrotra et al. | 365/185.03 |
| 5,184,282 | 2/1993 | Kaneda et al. | 361/737 |

(List continued on next page.)

FOREIGN PATENT DOCUMENTS

| | | |
|---|---|---|
| 0 214 478 | 3/1987 | European Pat. Off. . |
| 0 228 278 | 7/1987 | European Pat. Off. . |
| 0 321326 | 6/1989 | European Pat. Off. . |
| 0 385 750 | 9/1990 | European Pat. Off. . |
| 0 406 610 | 1/1991 | European Pat. Off. . |
| 0 476 892 | 3/1992 | European Pat. Off. . |
| 2-301155 | 12/1990 | Japan . |
| 3-14192 | 1/1991 | Japan . |
| 3-2099 | 1/1991 | Japan . |
| 3-114788 | 5/1991 | Japan . |
| 4-16396 | 1/1992 | Japan . |
| 4-148999 | 5/1992 | Japan . |
| 5-134820 | 6/1993 | Japan . |
| 6-195524 | 7/1994 | Japan . |
| 6-236316 | 8/1994 | Japan . |
| 6-318390 | 11/1994 | Japan . |
| 2609431 | 2/1997 | Japan . |

*Primary Examiner*—Trong Phan
*Attorney, Agent, or Firm*—Finnegan, Henderson, Farabow, Garrett & Dunner, L.L.P.

[57] ABSTRACT

A connecting apparatus, which can be used in combination with a plurality of IC, cards. The connecting apparatus holds an inserted smart card (first IC card) having a first flat type connecting terminal on a first face thereof and holds a memory card (second IC card) having a second flat type connecting terminal on a first face thereof and smaller than the first IC card. The connecting apparatus comprises a first connecting device having a slot into which the smart card is inserted and a connecting electrode which is so formed as to contact the flat type connecting terminal when the smart card is inserted into the slot; a second connecting device having a slot into which the memory card is inserted and a connecting electrode which is so formed as to contact the flat type connecting terminal when the memory card is inserted into the slot. The second connecting device is formed at a side, of the first connecting device, in which the connecting electrode of the first connecting device is formed, such that a region in which the connecting electrode is formed is exposed.

50 Claims, 15 Drawing Sheets

U.S. PATENT DOCUMENTS

| | | | |
|---|---|---|---|
| 5,272,374 | 12/1993 | Kodai et al. | 257/679 |
| 5,276,317 | 1/1994 | Ozouf et al. | 235/486 |
| 5,293,236 | 3/1994 | Adachi et al. | 348/231 |
| 5,297,029 | 3/1994 | Nakai et al. | 365/238.5 |
| 5,297,148 | 3/1994 | Harari et al. | 714/710 |
| 5,299,089 | 3/1994 | Lwee | 361/684 |
| 5,343,319 | 8/1994 | Moore | 359/152 |
| 5,375,037 | 12/1994 | LeRoux | 361/684 |
| 5,388,084 | 2/1995 | Itoh et al. | 365/226 |
| 5,430,859 | 7/1995 | Norman et al. | 711/103 |
| 5,438,359 | 8/1995 | Aoki | 348/207 |
| 5,457,590 | 10/1995 | Barrett et al. | 360/133 |
| 5,469,399 | 11/1995 | Sato et al. | 365/226 |
| 5,475,441 | 12/1995 | Parulski et al. | 348/552 |
| 5,488,433 | 1/1996 | Washino et al. | 348/722 |
| 5,497,418 | 3/1996 | Kudelski | 380/20 |
| 5,508,971 | 4/1996 | Cernea et al. | 365/185.23 |
| 5,509,018 | 4/1996 | Niijima et al. | 714/710 |
| 5,535,328 | 7/1996 | Harari et al. | 714/7 |
| 5,550,709 | 8/1996 | Iwasaki | 361/684 |
| 5,563,825 | 10/1996 | Cernea et al. | 365/185.18 |
| 5,566,105 | 10/1996 | Tanaka et al. | 365/185.22 |
| 5,568,424 | 10/1996 | Cernea et al. | 365/185.33 |
| 5,572,466 | 11/1996 | Sukegawa | 365/185.33 |
| 5,572,478 | 11/1996 | Sato et al. | 365/226 |
| 5,584,043 | 12/1996 | Burkart | 710/62 |
| 5,592,420 | 1/1997 | Cernea et al. | 365/185.18 |
| 5,596,532 | 1/1997 | Cernea et al. | 365/185.18 |
| 5,602,987 | 2/1997 | Harari et al. | 714/8 |
| 5,608,673 | 3/1997 | Rhee | 365/185.33 |
| 5,611,057 | 3/1997 | Pecone et al. | 710/102 |
| 5,615,344 | 3/1997 | Corder | 710/129 |
| 5,621,685 | 4/1997 | Cernea et al. | 365/185.18 |
| 5,638,321 | 6/1997 | Lee et al. | 365/185.17 |
| 5,663,901 | 9/1997 | Wallace et al. | 365/52 |
| 5,671,229 | 9/1997 | Harari et al. | 714/710 |
| 5,691,525 | 11/1997 | Aoki et al. | 235/379 |
| 5,878,134 | 3/1999 | Handelman et al. | 380/20 |
| 5,887,145 | 3/1999 | Harari et al. | 710/102 |
| 6,002,605 | 12/1999 | Iwasaki et al. | 235/380 |
| 6,010,066 | 1/2000 | Itou et al. | 235/379 |

CONNECTING APPARATUS, AND INFORMATION PROCESSING APPARATUS

This is a continuation of application Ser. No. 09/030,856, filed Feb. 24, 1998. The contents of this application being relied upon and incorporated by reference herein.

BACKGROUND OF THE INVENTION

1. Field of the Invention

The present invention relates to a connecting apparatus which is driven by receiving an inserted IC card, (smart card, memory card or the like) which is a media composed of a semiconductor element mounted on a thin material. The present invention also relates to an information processing apparatus.

2. Description of the Related Art

In recent years, electronic business transactions and electronic banking have been put into practical use. Thus, a smart card which is an IC card containing an CPU is attracting attention as a key medium. However, it has a limitation in using it as a medium to record image data of photographs of identifications, signs, fingerprints, and the like, because the capacity of the smart card is as small as 0.5–32 kilobytes. For example, in holding digital signature (DSA) of a photograph of a face, a fingerprint, a voiceprint to authenticate a person in the smart card, the DSA has a limit in its size. Security is demanded to a higher degree in recent years in electronic banking and electronic business transactions because a greater amount of money is handled. It is difficult for the smart card to hold greater information as authenticating digital signature.

Recently, an IC card smaller than the smart card and having a greater storage capacity than the smart card is attracting public attention. The IC card is composed of a memory element and has an area half of the area of the smart card or smaller. In addition, the IC card has a storage capacity of 1 MB–16 MB or more. Thus, it can serve like a vehicle or a container or various kinds of digital data, such as documents, images, and the like.

In order to drive the IC card, it is necessary to contact a flat type connecting terminal thereof with an electrode of a reading/writing equipment side. The IC card has a problem that when the electrode had deteriorated mechanically owing to wear with age, reliability on the performance of contact between the IC card and reading/writing equipment side degrades. As described above, because in many cases, the IC card is used in electronic business transactions, electronic banking, and so on which should be made at a high degree of reliability. Thus, the degradation of the reliability is a big problem.

Currently, the utilization of computer networks such as Internet, Intranet, and the like has become very popular among enterprises, homes, and the like. Important information, confidential documents, business transaction information (electronic settlements of accounts, electronic money information) are increasingly handles such an infrastructure. Thus, it has become more and more important to obtain security for hardware, software, and data constituting such a network. Above all, the smart card is popularly adopted as an ID card, electronic chart, patient's chart, and the next generation credit card. Thus, a higher degree of security if demanded for user.

SUMMARY OF THE INVENTION

It is an object of the present invention to provide a connecting apparatus which can be used in combination with a plurality of IC cards and an information processing apparatus.

It is another object of the invention to provide a connecting apparatus capable of securing reliability on a connection between it and IC cards.

It is still another object of the invention to provide an information processing apparatus capable of providing a high degree of security in IC card-used processing of electronic information.

In order to achieve the objects, the connecting apparatus and the information processing apparatus have constructions as will be described below.

The connecting apparatus of the present invention holds an inserted IC card having a first flat type connecting terminal on an first face thereof and an inserted second IC card having a second flat type connecting terminal on a first face thereof and smaller than the first IC card. The connecting apparatus comprises a first connecting means having a slot into which the first IC card is inserted and a first connecting electrode which is so formed as to contact the first flat type connecting terminal when the first IC card is inserted into the first slot; a second connecting means having a slot into which the second IC card is inserted and a second connecting electrode which is so formed as to contact the second flat type connecting terminal when the second IC card is inserted into the second slot.

The first IC card conforms to ISO7810 (smart card and IC card of EMV specification are included). As the second IC card, an IC card having an area not more than half of the area of the first IC card can be used. For example, an IC card conforming to JEDEG-MO186 (FLOPPY DISK CARD) can be exemplified.

Preferably, the second connecting means is formed at a side of the first connecting means. In which the first connecting electrode of the first connecting means is formed such that a region in which the first connecting electrode formed is exposed. A region not covered with the second connecting means is formed on the first connecting means by forming the second connecting means holding the second IC card smaller than the first IC card on the first connecting means having the first IC card. It is possible to form the first connecting electrode in region not covered with the second connecting means, for obtaining an electrical connection with the first flat type connecting terminal of the first IC card inserted into the first slot. Further, it is possible to mount a controller for driving the first IC card or the second IC card in the region.. Accordingly, the connecting apparatus is allowed to be think and compact.

Preferably, the first connecting electrode and the second connecting electrode are formed in the same side of the first slow and the second slot. The construction allows the first face of the first IC card and the first face of the second IC card to face in the same direction when the first IC card and the second IC card are inserted into each of the first slot and the second slot. In this case, preferably, the first connecting electrode or the second connecting electrode is so formed that a user understands the flat type connecting terminal when the user inserts the first IC card or the second IC card into the slot.

the first slot and the second slot are formed such that an insertion direction of the first IC card and an insertion direction of the second IC card are substantially identical to each other. The first IC card or the second IC card can be conventionally inserted into the slot and taken out therefrom and the connecting apparatus is allowed to be compact by making the insertion direction of the first IC card and that of the second IC card coincident with each other.

Preferably, an opening of the first slot and an opening of the second slot are formed on the substantially same plane.

Preferably, the first slot and the second slot are formed such that the first slot and the second slot overlap with each other with two sides in common with each other when the first slot receives the first IC card and the second slot receives the second IC card.

The first IC card and the second IC card may be different from each other in the sizes and functions thereof. For example, the first IC card may have a CPU, and the second IC card may be a memory card. Needless to say, the second IC card may be provided with a CPU function. The memory card may have a serial access type memory element (memory element to which addresses and data are inputted from common terminals and from which addresses and data are outputted), for example, an NAND type EEPROM or AND type EEPROM. The number of flat type external connecting terminals and the construction thereof can be standardized by employing such a serial access type memory element, irrespective of the integration degree of a semiconductor device. Because the serial access type memory element has an advantage of inputting and outputting serial type data, such as text, image, video, music, and the like at a high speed, such a second card can be very favorably used to hold file data.

Preferably, the connecting apparatus has an interface means connected with the first connecting electrode and the second connecting electrode and driving the first IC card and the second IC card in parallel. "Driving the first IC card and the second IC card in parallel" including the case in which one common interface circuit drives the first IC card and the second IC card, and the case in which at least one of wiring connecting the interface and the first connecting electrode as well as the second connecting electrode with each other is commonly used.

The connecting apparatus can be allowed to be thin and compact by forming the interface means at a side, of the first connecting means, in which the first connecting electrode of the first connecting means is formed such that the interface means is adjacent to the second first connecting means.

Preferably, the interface means has a means for executing decoding and encoding of data inputted to and outputted from a first IC card or a second IC card.

The interface means may have at least one CPU or one DSP. For example, it is possible to accomplish complicated processing such as decoding and encoding of data inputted to and outputted from the first IC card or the second IC card in combination of the CPU and the DSP of the interface means or in combination of the CPU and the DSP contained in the IC card.

An information processing apparatus comprising a casing; a substrate accommodated in the casing and having a central processing unit mounted thereon; a connecting apparatus having a first slot and a second slot formed therein and installed on one surface of the casing; and interface means, formed on the substrate, for controlling signals in parallel which are transmitted between the central processing unit and the first IC card as well as the second IC card; and a connection wire connecting the interface means and the first connecting electrode as well as the second connecting electrode with each other. The central processing unit means an apparatus, for example, a CPU and a DSP installed in the information processing apparatus and executing control and operation (arithmetic) by its high performance.

For example, the information processing apparatus has the following construction: A connecting apparatus holding a plurality of IC cards having different sizes is installed at a portion (for example, bay of 3.5-inch width or 5-inch width and half-span height or 1-span height) in which a floppy disk drive is mounted. An interface means comprising a controller of two IC cards is interposed between the connecting apparatus and the central processing unit at a personal computer side or a bus connected with the central processing unit to connect the connecting apparatus and the personal computer with each other. IN the present invention, so long as a plurality of IC cards is driven in parallel, the interface means may be positioned at the connecting apparatus side or at the personal computer side.

It is possible to connect the interface means with a power supply terminal or a ground terminal of the first connecting electrode which is connected with the first flat type connecting terminal of the first IC card and the second connecting electrode which is connected with the second flat type connecting terminal of the second IC card through a common connection wire. According to the present invention, an access to the IC contained in each of the first IC card and the second IC card is executed through each of the first and second flat type connecting terminals exposed on the surface of the first IC card and the second IC card. Accordingly, it is possible to input addresses, data, and commands to the first IC card and the second IC card and output them therefrom in parallel by using a common interface. At this time, the power supply and the supply of the ground potential can be accomplished by using the common wire. Thus, the number of connecting wiring(s) can be reduced.

An information processing apparatus of the present invention comprises a connecting means having a slot receiving and IC card containing and IC having a flat type connecting terminal; and an interface means accessing to the IC card through the connecting electrode and the flat type connecting terminal. The interface means has a counter means for counting the number of times of a contact between the connecting electrode and the flat type connecting terminal; and a means for comparing a predetermined value indicating the number of times of the contact between the connecting electrode and the flat type connecting terminal with a value counted by the counter and stopping an access to the IC card when the value counted by the counter has reached the predetermined value.

For example, in the information processing apparatus may comprising a connecting means having a slot receiving an IC card containing an IC having a flat type connecting terminal; and an interface means accessing to the IC card through the connecting electrodes and the flat type connecting terminal, the interface means may have a memory means for storing a predetermined value as the number of times of a contact between the connecting electrode and the flat type connecting terminal; a counter means for counting the number of times of the contact between the connecting electrode and the flat type connecting terminal; and a means for comparing the predetermined value stored by the memory means with a value counted by the counter and stopping an access to the IC card when the value counted by the counter has reached the predetermined value.

More specifically, in order to access to the IC card, it is necessary to allow a contact between the flat type connecting terminal of the IC card and the connecting electrode of the connecting apparatus such as contact pins. There is a possibility that the reliability of the connecting apparatus deteriorates due to wear; signals cannot be inputted to the IC card and outputted therefrom; or an erroneous operation occurs. Accordingly, according to the information processing apparatus of the present invention, the number of times of the insertions of the IC card into the slot and the number of times of the contact between the connecting electrode and the flat type connecting terminal of the IC card are counted. The input/output of signal to/from the IC card is stopped when the counted value has reached the predetermined value.

The realizability on the system can be improved in utilizing the IC card by forming the connecting electrode is capable of exchanging, and a value counted by the counter is reset when the connecting electrode is exchanged. For example, the connecting electrode of the connecting means is so formed that the connecting has a means for discriminating an unused state and a used state from each other electrically or mechanically. A value counted by the counter is reset only when the connecting electrode in the unused state is exchanged. Such a construction can prevent an erroneous operation from occurring, thus allowing security to be given to data. The predetermined value for resetting may be stored in a memory of the interface means.

There is provided an information processing apparatus of the present invention which is driven by receiving an inserted IC card having a first flat type connecting terminal on a first face face thereof and an inserted second IC card having a second flat type connecting terminal on a first face thereof and smaller than the first IC card, the information processing apparatus comprising an interface means for driving the first IC card through the first flat type connecting terminal and driving the second IC card through the second flat type connecting terminal in parallel. The interface means has a means for executing decoding and encoding of data inputted to and outputted from a first IC card or second IC card.

The first IC card has a means for decoding or encoding data which is inputted to and outputted from the first IC card or the second IC card; and the interface means a means for executing decoding or RSA of data which is inputted to and outputted from the first IC card or the second IC card.

For example, when a smart card having a CPU is used as the first IC card, and a memory card is used as the second IC card, the CPU of the first IC card may execute decoding and encoding of DES, and the interface means may execute decoding and encoding of RSA. It is difficult to mount a high-performance CPU on the smart card in consideration of the size and cost thereof. Thus, it is preferable that the CPU of the smart card executes relatively "light" DES encoding/decoding calcuration, while the CPU of the interface means executes relatively "heavy" RSA encoding/coding calculation. In such a case, the first IC card may hold a value of an encoding key and the first IC card any decode data held by the second IC card. By doing so, the data cannot be accessed without the first IC card when the memory card is used as the second IC card, which promotes a security. A co-processor, which encrypts the DES or the like, may be mounted in the IC of the smart card.

The memory card has a much greater storage capacity than the smart card. Thus, the use of the memory card as the second IC card allows large sized information (for example, photograph of user's face, fingerprint, voiceprint, etc.) to be used as digital sign for authentication. Further, such data may be stored by the second IC card after the data is encrypted by the operation device at the interface side or the operation device of the first IC card.

The connecting apparatus and the information processing apparatus of the present invention are applicable to information processing systems which execute transmission of data through a network. For example, a processing system comprises a first IC card holding a value of a DES-encoding key and having a first flat type connecting terminal on a first face thereof; a second IC card having data containing digital data and having a second flat type connecting terminal on a first face thereof and smaller than the first IC card; a means for receiving the first IC card and the second IC card; an interface means having a CPU connected with a network and driving in parallel the first IC card through the first flat type connecting terminal and the second IC card through the second flat type connecting terminal; a means for encrypting data of DES by means of a CPU of the first IC card; a means for encrypting a value of a key for decoding encrypted data of DES by an open key of a receiver; and a means for transmitting to the network the encrypted data of DES and the value of the data-decoding key encrypted by the open key of the receiver. For example, data transmission based on SET (Secure Electronic Transaction) protocol may be executed.

Photographs, fingerprints, voiceprints or a combination thereof may be used as a digital sign to authenticate a person. The data of photographs, fingerprints, voiceprints or the like may be encrypted by the person's own key by using RSA to store the data in a memory card. The encryption of the RSA may be processed by a CPU or a DSP of the interface circuit and the encrypted data may be stored in the memory card.

The data encrypted by the DES may be processed by the CPU of the IC card or processed by using the CPU or DSP of the interface circuit, based on the value of the encryption key stored in the IC card.

The DES-decrypting key for decoding data encrypted by the DES is encrypted by the public key of the receiver by using the RSA. As described above, complicated processing can be accomplished in a short period of time by using the CPU or the DSP of the peripheral interface circuit or the like.

The reason encoding an decoding are preferably performed on the external CPU or the DSP of the interface circuit is because as the number of bits of the value of the RSA key becomes longer to improve data security, a burden is increasingly applied to the CPU or the DSP. Thus, a CPU of a comparatively which has short bit length, for example, eight bits and can be mounted in the IC card takes a long time to execute processing. On the other hand, the external high-performance 16-bit or 32-bit CPU or DSP of the interface circuit or the like has a high performance and can be installed on the interface circuit or the like, depending on necessity because they have less restrictions than the CPU of the short bit length in installing them on the interface circuit or the like.

The encrypted digital sign, the encrypted data, and the encrypted decrypting key may be sent to the network and received therefrom.

The IC card can be classified into two types, depending on whether it has a CPU. Herein, the IC card (for example, IC card conforming to ISO) having the CPU loaded therein is called a smart card, whereas the IC card not having a CPU and substantially composed of a memory element is called a memory card.

As described above, the electronic business transaction system, the electronic banking system, and the electronic money system can be efficiently utilized in combination of the connecting apparatus of the present invention or the information processing apparatus thereof and a plurality of IC cards, for example, the smart card and the memory card.

Further, the connecting apparatus of the present invention or the information processing apparatus thereof may be used as a system of distributing file data though various kinds of networks such as the Internet.

For example, such a communication system comprises an IC card having a flat type connecting terminal and a serial access type memory element connected with the flat type connecting terminal; and a means for transmitting file data to the memory element through the external flat type connecting terminal.

The identification of users and payment required in distributing file data may be executed by using an IC card (first IC card) having a flat type connecting terminal; a CPU connected with the first flat type connecting terminal, and a memory element connected with the CPU.

The file data may be distributed by encrypting it.

The file data includes music data, image data, and video data, in addition to text data.

Of such data, the music data may be distributed by compressing it by using compression algorithm such as AAC, AC-3 or the like. The image data may be compressed by compressing it by using the compression algorithm such as JPEG or the like.

As described above, the electronic business transaction system, the electronic banking system, and the electronic money system can be efficiently utilized in combination of the connecting apparatus of the present invention or the information processing apparatus thereof and a plurality of IC cards, for example, the smart card and the memory card.

In such a case, the security of the system can be enhanced by using encrypted identification data held in the memory card for authentication and using the smart card serving as a means for payment, in combination with the memory card.

As the identification data, image data such as a fingerprint, a photograph of a face, the iris; voice data; and a combination thereof may be used. It is preferably that the identification data is encrypted as a digital sign to authenticate individuals. For example, the identification data may be encrypted by a CPU of an interface to store the encrypted identification data in the memory card. Further, when the identification data is encrypted by an external interface, the encoding may be executed, based on a value of a key held in the smart card.

As an example of such a system, music distribution and payment which are executed by using two IC cards is described below. That is, music is distributed to users by using various networks and the data of the distributed music is stored in the memory card (for example, second IC card). Using the IC card makes the payment and settlement of accounts for the music distribution (for example, first IC card). Because the data of music, image, and video is suitable for serial access, it is appropriate to hold it in the IC card having the flat type connecting terminal and a serial access type memory element.

It is preferable to distribute the data of music by compressing it by using the compression algorithm such as AAC, AC-3 or the like to prevent traffic congestion and improve communication speed. Storing the data of music in a compressed state therein can save the capacity of the memory card. The memory card may hold the data of music by encrypting it. The music data itself may be encrypted. The encrypted music data stored in the music data may be held in the memory card.

Music can be distributed to users through various kinds of networks such as the Internet and the processing of the payment for the distribution of the music can be accomplished by using such a music distribution system.

The distribution system of music data has been described above as an example of file data. In addition, the file data is applicable to distribution systems such as text data distribution system, image data distribution system, video data distribution system (moving data such as MPEG, MPEG2), and the like.

DESCRIPTION OF THE PREFERRED EMBODIMENTS

In the following, the present invention will be described in detail with reference to the embodiments.

Embodiment 1

Figure 1:
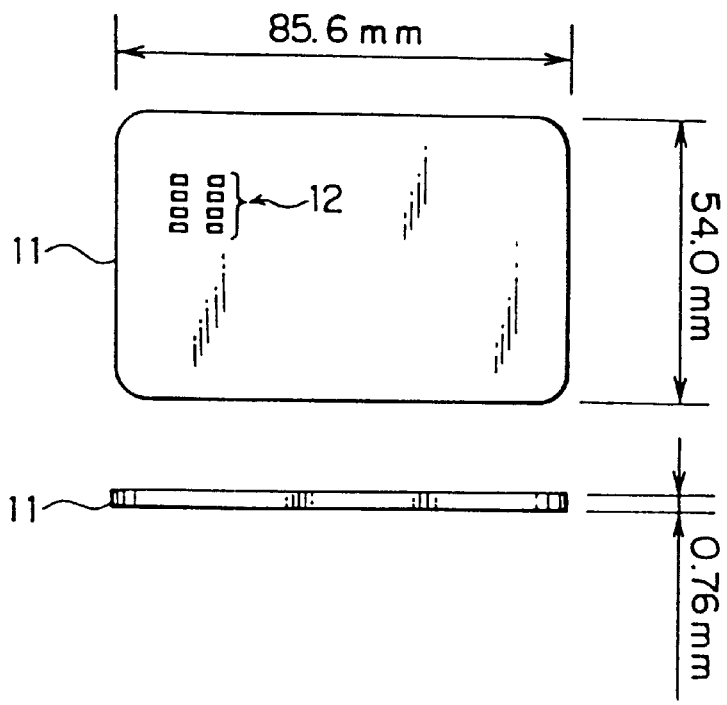
FIG. 1 is a view schematically showing an example of a first IC card (smart card) which is received by a connecting apparatus according to the present invention.
Figure 2:
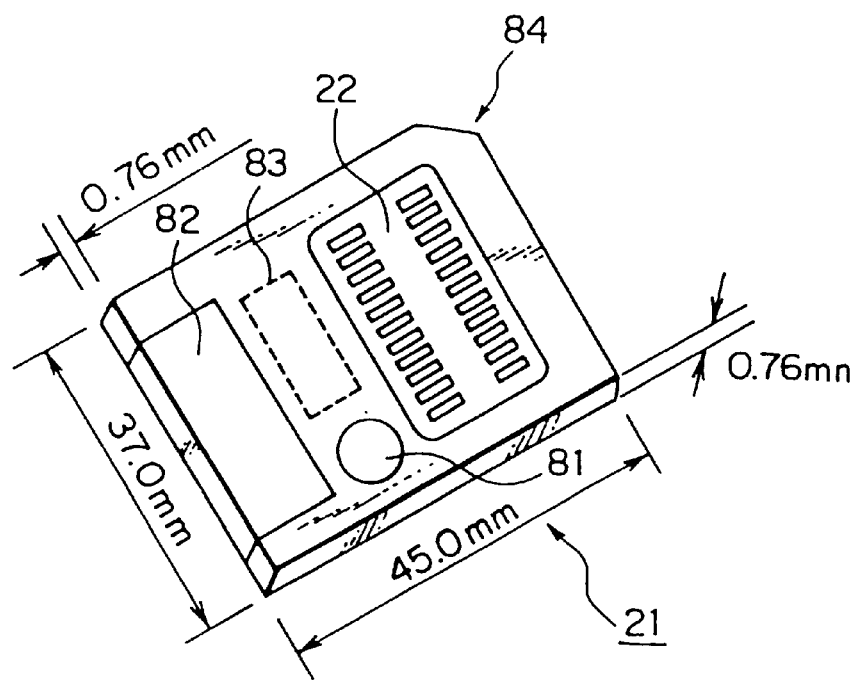
FIG. 2 is a view schematically showing an example of a second IC card (memory card) which is received by the connecting apparatus according to the present invention.

FIG. 1 is a view schematically showing an example of a first IC card, which is received by a connecting apparatus according to the present invention. FIG. 2 is a view schematically showing an example of a second IC card, which is received by the connecting apparatus according to the present invention.

With a smart card 11 and a memory card 21 smaller the smart card 11 as an example of the first IC card and the second IC card, respectively, description will be done.

The smart card 11 has a length of 85.6 mm, a width of 54.0 mm, and a thickness of 0.76±0.08 mm, thus conforming to the ISO7810. The smart card 11 has a flat type connecting terminal 12 exposed on its one surface. The flat type connecting terminal 12 of the smart card 11 also conforms to the ISO7816. Access to an IC contained in the smart card 11 is executed through the flat type connecting terminal 12.

The memory card 21 shown in FIG. 2 has a length of 45.0±0.1 mm, a width of 37.0 mm±0.1 mm, and a thickness of 0.76±0.08 mm, thus conforming to the MO-186 (floppy disk card) of JEDEC. Although the shape and the number of pins are different from those of the flat type electrode 12 of the smart card 11, the memory card 21 has also the flat type electrode 22 exposed to the outside on its one surface, thereby, access to an IC housed is executed through the first type electrode 22.

Figure 3:
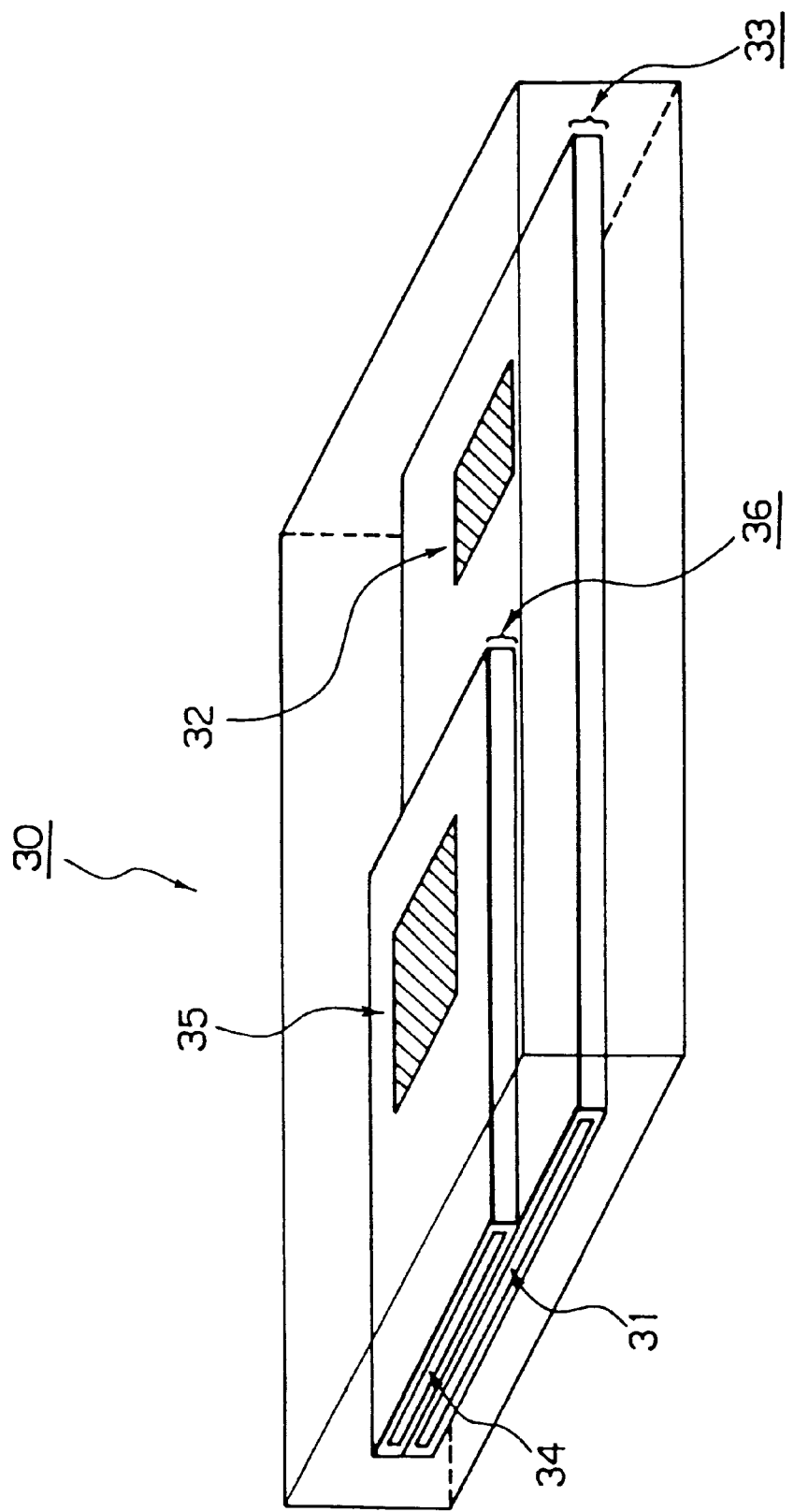
FIG. 3 is a view schematically showing an example of the construction of the connecting apparatus of the present invention.
Figure 4:
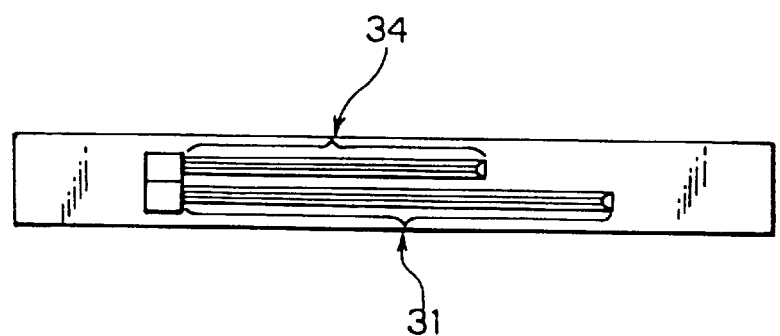
FIG. 4 is a view showing the connecting apparatus of the present invention view from an open side of a slot thereof.
Figure 5:
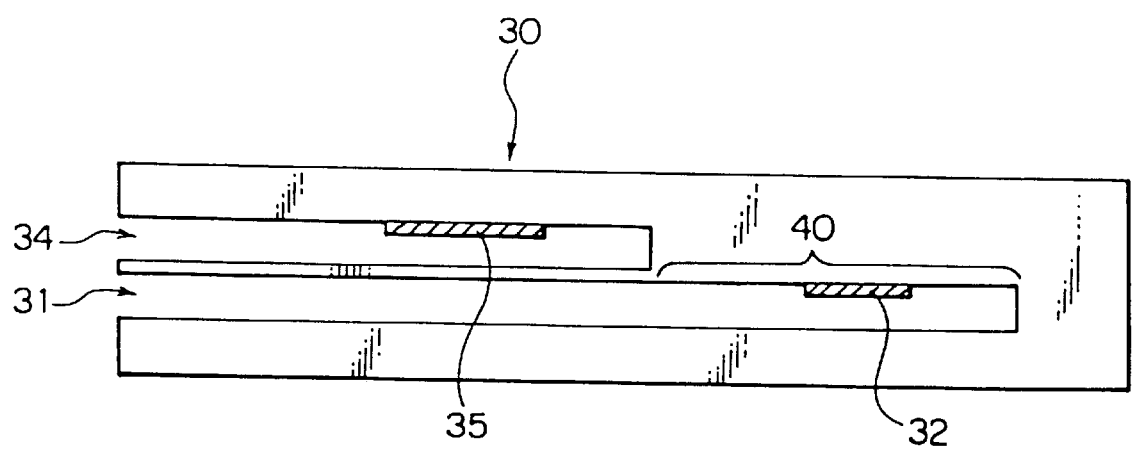
FIG. 5 is a view perspectively showing the connecting apparatus of FIG. 3 viewed from a side.

FIG. 3 is a view schematically showing an example of the construction of connecting apparatus 30 of the present invention. FIG. 4 is a view showing the connecting apparatus 30 of the present invention viewed from an open side of the slot thereof. FIG. 5 is a perspective view showing schematically the connecting apparatus 30 of FIG. 3 viewed laterally.

The connecting apparatus 30 in an apparatus which holds inseted the smart card (the first IC card) 11 having the first flat type connecting terminal 12 on a first face thereof and holds the inserted memory card (the second IC card) 21 having the second flat type connecting terminal 22 on a first face thereof and smaller than the first IC card 11. The connecting apparatus 30 comprises a first connecting means 33 having a slot 31 into which the smart card 11 is inserted and connecting electrode 32 which is so formed as to contact the flat type connecting terminal 12 when the smart card 11 is inserted into the slot 31; a second holding means 36 having the slot 34 which is stacked so as to expose an area where the connection electrode 32 is formed on the side surface thereon the connection 32 of the first holding means 33 are formed and through which the memory card 21 is inserted, and a connection electrode 35 formed to contact with the plane terminal 22 when the memory card 21 is inserted into the slot 34.

The first connecting means 33 and the second connecting means 36 are so combined with each other as to hold the smart card 11 and the memory card 21 in the lower slot 31 and the upper slot 34, respectively.

The first connecting means 33 and the second connecting means 36 are not necessarily required to have a shape to cover each of the smart card 11 and the memory card 21 entirely but required to serve as a means for holding the IC card such that the inserted smart card 11 and the memory card 21, respectively. For example, they may be so shaped as to hold a part of the IC card.

Figure 6:
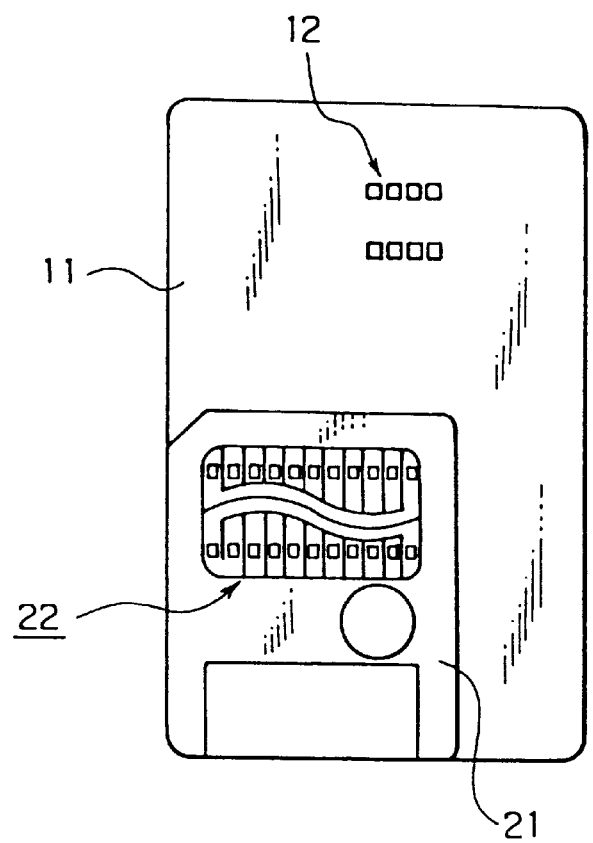
FIG. 6 is a view for describing an example of the relationship between the position of the smart card and that of the memory card when they have been inserted into the respective slots.

FIG. 6 is a view for describing an example of the relationship between the position of the smart card 11 and that of the memory card 21 when the smart card 11 has been inserted into the slot 31 and the memory card 21 has been inserted in the slot 34. The smart card 11 and the memory card 21 can be inserted into the slot, without overlapping the flat type connecting terminal 12 and the flat type connecting terminal 22 with each other, by overlapping the opening side of the slot with each other.

The connecting apparatus of the present invention are formed to contact from the same side with respect to the first flat type connecting terminal 12 and the second flat type connecting terminal 22. The connecting electrode 32 can be connected in a region 40 where the first connecting means 33 and the second connecting means 36 do not overlap with each other. An interface circuit including a controller for driving the smart card 11 and the memory card 21 may be formed in the region 40.

Figure 7:
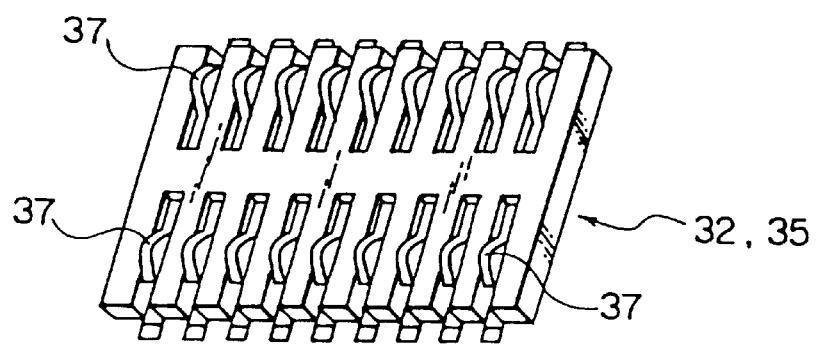
FIG. 7 is a view schematically showing an example of a connecting electrode, which contacts a flat type connecting terminal.

It is required that the connecting electrode 32 which is connected with the flat type connecting terminal 12 of the smart card 11 and the connecting electrode 35, which is connected with the flat type connecting terminal 22 of the memory card 21, has a construction according to the shape of the flat type connecting terminal 22. FIG. 7 is a view schematically showing an example of the connecting electrodes, 32 and 35, which contact with the flat type connecting terminals 12 and 22. It is possible to provide a contact pin 37 having a spring mechanism which is shown in FIG. 7, according to the pattern of the flat type connecting terminal. It is possible to position the connection electrode 32, 35, and such as a wiring connecting the interface circuit.

The smart card 11 will be described in detail below.

Figure 8A:
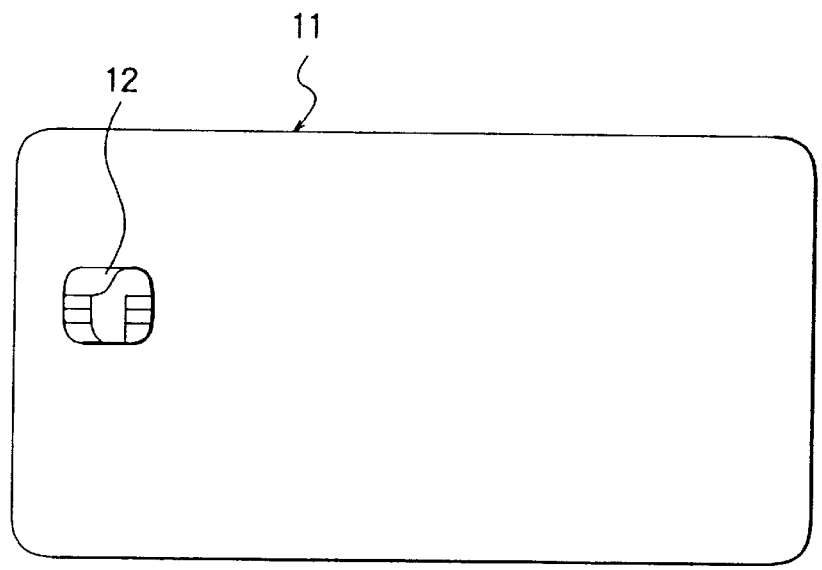
FIGS. 8A and 8B are views showing the construction of the smart card.
Figure 8B:
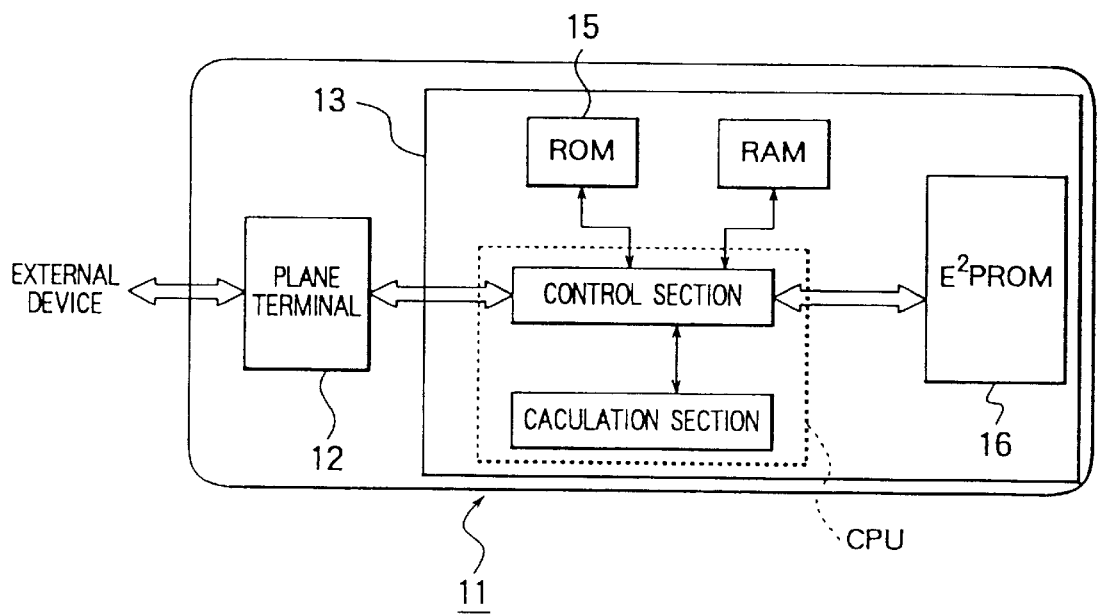

FIGS. 8A and 8B are views showing schematically the construction of the smart card 11, which is a kind of the IC card having a CPU and a memory. The smart card 11 contains an MPU13 chip comprising a CPU 14, a program memory (ROM) 15, and an EEPROM 16 which is a data memory. The MPU13 chip is molded on one side of a wiring substrate, and the flat type connecting terminal 12 is formed on the other surface so as to be connected with the MPU13.

Figure 9:
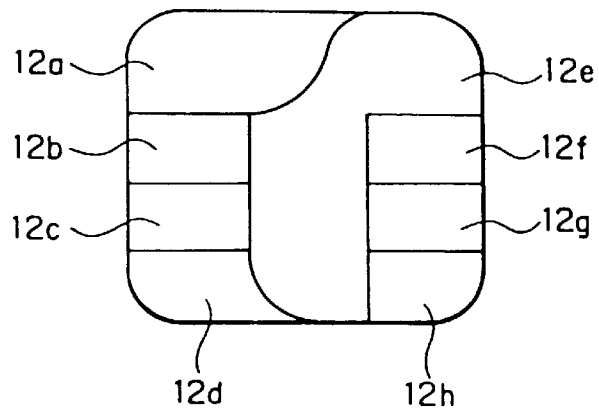
FIG. 9 is a view showing an example of a pattern of the flat type connecting terminal.

FIG. 9 shows an example of the pattern of the flat type connecting terminal 12 of the smart card 11.

A pin 12a is a power source, a pin 12b is a reset (RST), a pin 12c is a clock (CLK), a pin 12e is a ground (GND), a pin 12g is a transmission (I/O), pins 12d and 12h are spare pens, and a pin 12f is not used.

The memory care 21 will be described in detail below.

The memory card 21 is a flash memory card thereon a chip having an NAND type EEPROM is mounted. The memory card 21 has a length of 45.0±0.1 mm, a width of 37.0±0.1 mm, and a thickness of 0.76±0.08 mm, thus conforming to the MO-186 (floppy disk card) of JEDEC.

Figure 10:
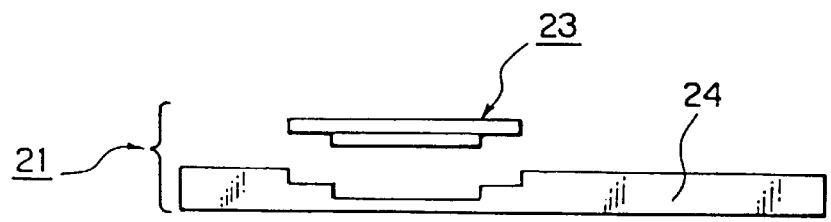
FIG. 10 is a view showing the construction of the memory card.

The memory card 21 is mainly constituted of two sections, As shown in FIG. 10, one is package 23 provided with a plane terminal thereon the memory chip is mounted and a base card 24 holding the package 23.

Figure 11:
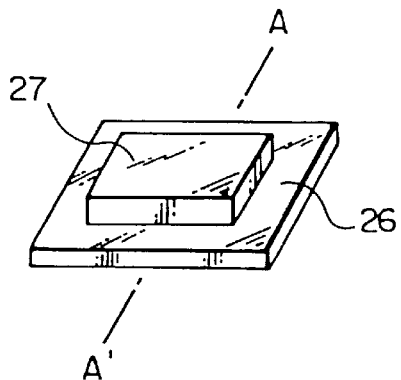
FIG. 11 is a view schematically showing the construction of a package having a memory chip and a flat type connecting terminal mounted thereon.
Figure 11:
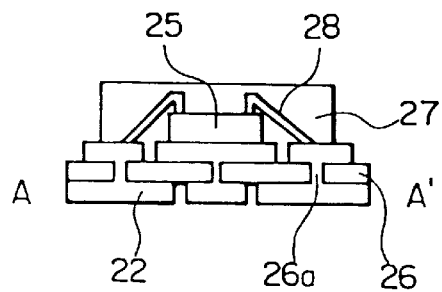

As shown in FIG. 11, the package 23 is formed of a wiring substrate 26 on which a memory chip 25 is mounted; and a resin 27 formed on one face of the wiring substrate 26 by molding. The memory chip 25 and a wiring board 26 are connected with each other with a wire bonding 28. In order to electrically connect with the outside, the flat type connecting terminal 22 is formed on the opposite side to the memory chip mounted surface. The flat type connecting terminal 22 and the memory chip 25 are electrically connected with each other via a through hole 26a disposed on the wiring substrate 26. The surface of the flat type connecting terminal 22 is plated with gold whose purity is 99.5% (hard gold plating) to improve its resistance to mechanical wearing. Such a construction allows the thickness of the package to be as small as about 0.65 mm.

The base card 24 holding the package 23 has a stepped concave where the package 23 is engaged. The package 23 is fixed to the base card 24 by bonding at the stepped portion formed on the base card 24 and at the area where the wiring board is not covered by molding resin. The flat type connecting terminal 22 of the package 23 is fixed so as to constitute an essentially same plane with the surface of the base card 24. The bottom portion of the concave portion of the base card 24 is formed a little bit deeper than the thickness of the mold layer 27 of the package 23 to reduce a stress which is applied to the memory chip 25 and enlarge the margin of a thickness controls which is made in a molding process. The thin portion of the base card 24 corresponding to the position of the memory chip 25 is so thin that the thin portion is formed of such as PC/ABS alloy high in its fluidity by injecting molding.

The package 23 is thermally fixed to the base card 24, with a thermal contact bonding sheet containing rubber as its main component placed on the stepped portion of the base card 24 and with the package 23 placed on the thermal contact bonding sheet.

Referring to FIG. 2, the memory card 21 has on its upper surface a contact region in which the flat type connecting terminal 22 is formed, a region 81 to which a seal indicating write inhibition is stuck, a region 82 to which an index label is stuck, and an indication region 83 on which the capacity of the memory chip, a supply voltage, kind are indicated. Depending on a supply voltage, a cut-out portion 84 is formed at the front right corner or the front left corner of the base card 24 in the insertion direction of the memory card 21. For example, the cut-out 84 is formed at the front left corner of the base card 24 in the insertion direction of the memory card 21 having a supply voltage of 5 V, whereas the cut-out 84 is formed at the front right corner of in the insertion direction of het memory card having a supply voltage of 3.3 V. The cut-out 84 functions in cooperation with an error insertion prevention mechanism, thus preventing the memory chip 25 from being electrically destroyed when a supply voltage 5 V is applied to the memory card 21 whose supply voltage is 3.3 V.

In order to execute a write inhibit, an electrically conductive seal is stuck to the region 81. That is, writing to the memory card 21 can be protected in a software manner and a hardware manner. That is, two terminals of the connecting electrode 35 of the slot 34 are contacted with a portion of the memory card 21 corresponding to the write protect region thereof to detect whether or not the seal has been stuck thereto, depending on a conductive state of the seal.

Taking a NAND type EEPROM (TC5816AFT manufactured by Toshiba Co., Ltd.) as an example, a NAND type flash EEPROM which is mounted in the memory card 21 is described below.

The memory of the memory card 21 is a flash memory, which is operated by single power source of 5 V or 3.3 V having a structure of 264 bytes×16 pages×512 blocks. The memory chip contains a static register of 264 bytes. The data of a program operation and that of a read operation are transferred in units of 264 bytes between the register and a memory cell array. The erasure of the data is executed in a block (units of 4 k bytes+128 bytes). The reason one page consists of not 256 bytes but 264, i.e., the reason a redundant region of eight bytes added to the 256 bytes is because the redundant region is normally used as the region for storing an ECC (error correction) sign or management information.

In the memory of complete serial type, where addresses, data, and commands are sequentially inputted thereto and outputted therefrom through input/output terminals of the flat type connecting terminal 22 thereof, the program and erasing operation are automatically executed in the memory chip.

Figure 12:
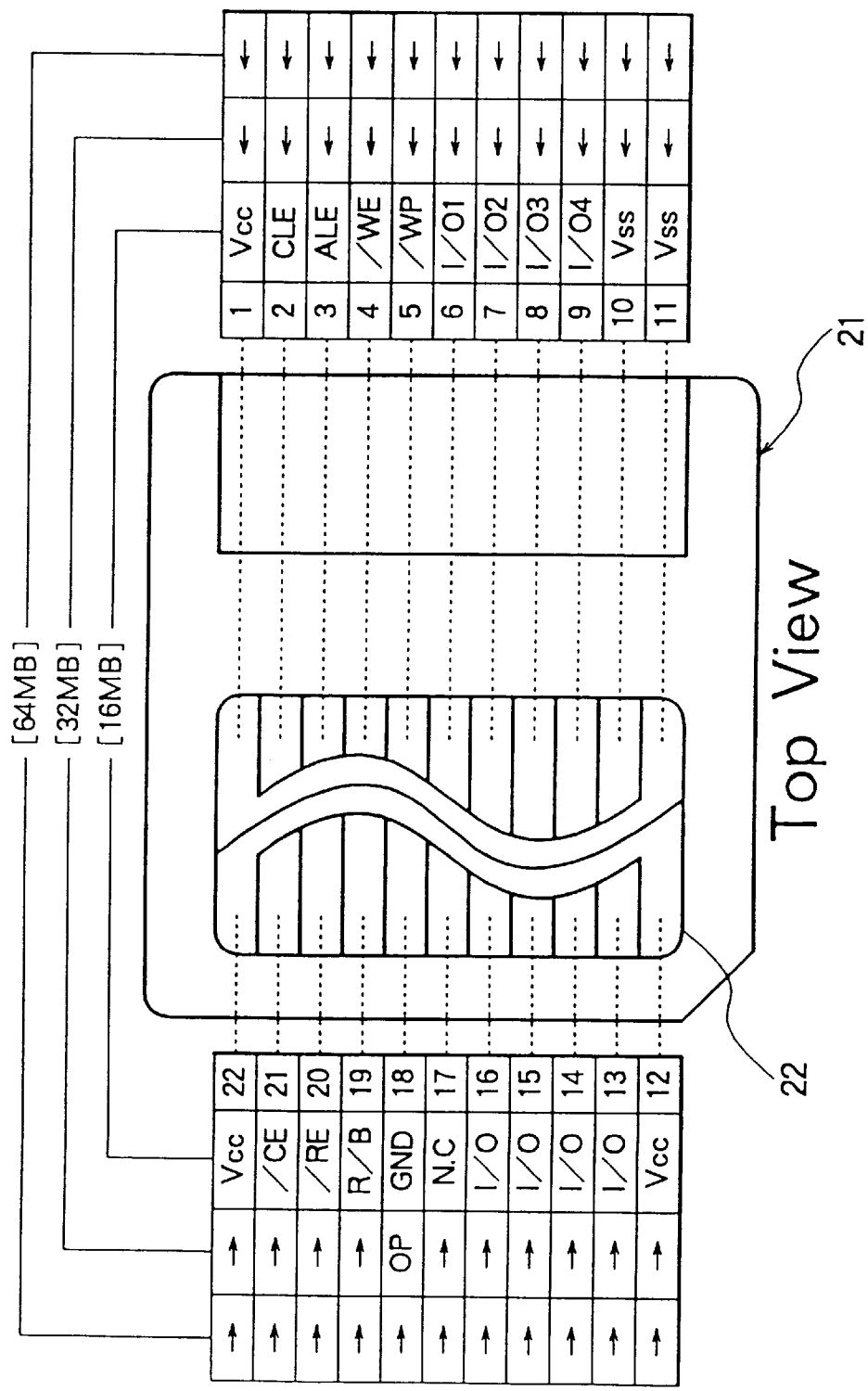
FIG. 12 is a view showing the specification of an NAND type EEPROM of 16 Mb and the layout of pins.
Figure 13:
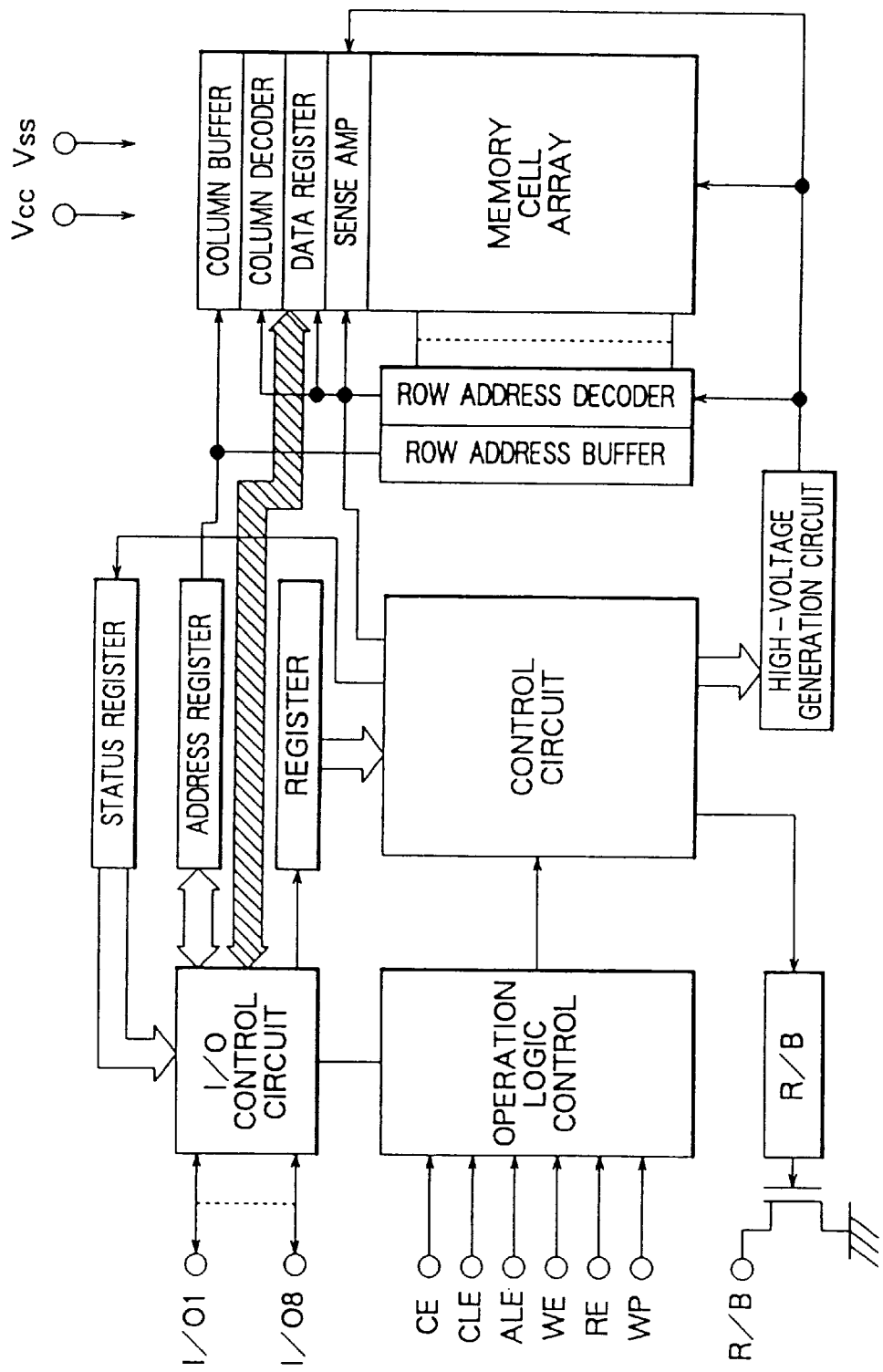
FIG. 13 is a block diagram showing the construction of a memory chip.

FIG. 12 is a view showing the specification of the NAND type EEPROM of 16 Mb and the layout of pins of the memory card 21. FIG. 13 is a block diagram showing the construction of the memory chip 25. Thus, the memory chip 25 does not contain any exclusive address pins, and addresses are inputted thereto through I/O pins at a plurality of sequences. Thus, the number of pins of the memory chip 25 is reduced, and it is unnecessary to increase pins even though the capacity of the memory increases as indicated in FIG. 12 showing the layout of the pins of the NAND type EEPROM of 16 Mb and 64 Mb. Accordingly, in the connecting apparatus of the present invention, the connecting apparatus can receive the memory cards 21 of various capacities without altering the construction of the connecting electrode 35 thereof. Further, the connecting electrode 35 can be commonly used for the memory cards 21 of various capacities. That is, only one connecting apparatus is sufficient for different kinds of memory cards.

The connecting apparatus of the present invention can be driven by receiving both the memory card 21 and the IC card 11 (smart card).

It is possible for the connecting apparatus of the present invention to adopt a sequence contact system to execute an insertion/removal at an active state. That is respective pins of the connecting electrode 32, 35 of the connecting apparatus sequentially contact respective pins of the flat type connecting terminal 12 of the smart card 11 and the flat type connecting terminal 22 of the memory card 21, when insertion or removal.

For example, as a first step, a terminal VSS of the memory chip 25 contacts the pin of the connecting electrode 35 to allow the ground level to be definite, and a CLE (Command Latch Enable: signal of command latching) is fixed at a low level (inactive state) to prevent an unrequited command from being inputted to the memory chip due to a noise or the like in a sequence which will follow.

As a second step, a CE pin (Chip Enable: chip selection terminal) is fixed at a high level (inactive state) to enable a Hi-z state for an output pin of the memory chip. Thus, collision of data does not occur on a bus at the interface side, irrespective of the state of the bus.

As a third step, because the terminal VCC attains a predetermined voltage at the second step, electric current can be prevented from flowing from a bus line through the output pin. Thus, it is possible to avoid problems such as latch-up from occurring in the drive of a CMOS device.

As a fourth step, no. 11 pins (VSS) contact with the pin of the connecting electrode 35. The no. 11 pins (VSS) can be used to detect the insertion of the memory card 21 into the slot 34 and its removal therefrom. For example, using the no. 11 pins, the number of times of connections between the connecting electrode 35 and the flat type connecting terminal 22 can be counted.

According to the sequence contact system, when the IC card 11 or 21 is removed from the slots 31 and 34, processing is executed in a sequence reverse to the above-described sequence.

Embodiment 2

Figure 14A:
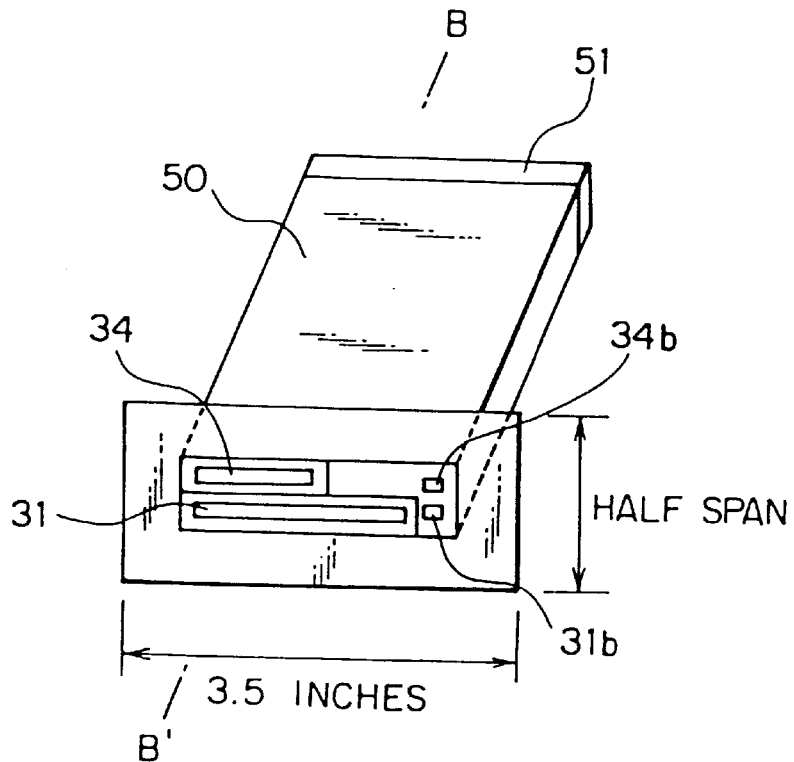
FIGS. 14A and 14B are views showing another example of the construction of the connecting apparatus of the present invention.
Figure 14B:
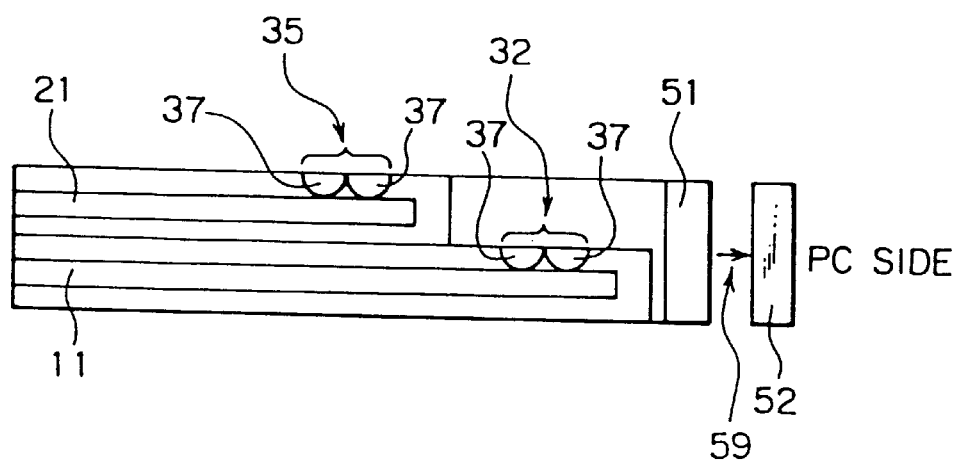

FIG. 14A and FIG. 14B show another example of the construction of the connecting apparatus 30 of the present invention. FIG. 14A shows the connecting apparatus 30 having two slots into which both of the smart card 11 and the memory card 12 can be inserted, respectively, and a state in which the connecting apparatus 30 is installed in a casing 50 which can be fitted in a front device bay of a personal computer not shown in FIG. 14A, having a size of a half span of 3.5 inches. The slot 34 for the memory card 21 is installed over the slot 31 for the smart card 11. This construction allows the memory card can be seen by the operator in case the smart card is inserted in the slot 31. In addition, placing the connecting electrodes 32, 35 at the upper side of the respective slots improves operability. Because, this construction allows the flat type connecting terminal exposed on each of the smart card 11 and the memory card 12 to be seen in inserting and removing to/from respective slots. The slots 31 and 34 are provided with an ejector mechanism, respectively. Reference numerals 31b and 34b denote ejector buttons. The ejector mechanism is provided if necessary.

FIG. 14B is a sectional view, showing the construction taken along a line B–B' of FIG. 14A. The connecting electrodes 32 and 35 formed on the upper surface of the slots are electrically connected with the flat type connecting terminal 12 of the smart card 11 and the memory card 21 respectively. In inserting the IC cards into the slots and removing them therefrom, the insertion and removal of the IC cards can be accomplished by the sequence contact system, namely, by sequencing the physical contact between the contact pins of the connecting electrodes and the flat type connecting terminals of the IC cards, as disclosed in Japanese Patent Application No. 6-254756 (JP-B2-2609431).

Wiring of connecting wiring 59 connecting the personal computer side and the connecting electrodes 32 and 35 with each other can be facilitated by bundling them. In this case, it is possible to reduce the number of connecting wiring 59 and allow them to serve as an interface between the connecting electrodes 32 and 35 and the personal computer side in a simple construction by using the power supply and the ground commonly. In this case, it is preferable to bundle 30 pieces of connecting wiring 59 or less. In order to prevent the interface circuit 55 from being subjected to noises in connecting the personal computer side and the connecting electrodes 32 and 35 with each other, it is preferable to provide the interface circuit 55 with a waveform shaping circuit such as a Schmidt trigger circuit to improve reliability.

Figure 15A:
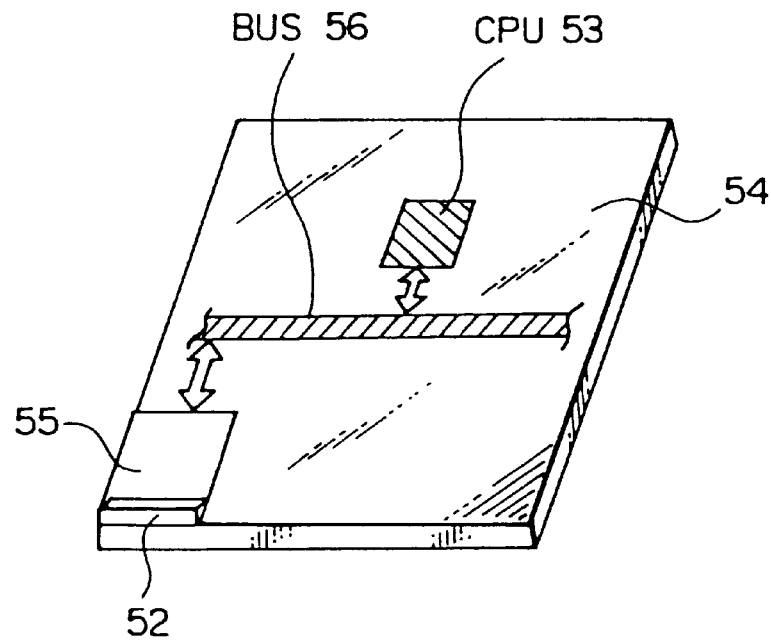
FIGS. 15A and 15B are views showing a state in which an interface circuit of the connecting apparatus of the present invention is installed on a substrate of a personal computer in which a CPU 53 is mounted.
Figure 15B:
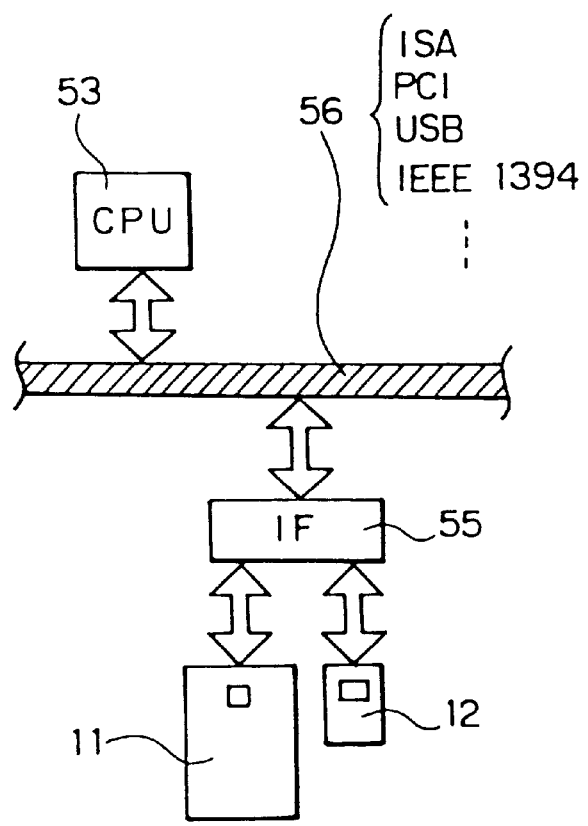

FIG. 15A and FIG. 15B are views showing a state in which the interface circuit 55 of the connecting apparatus 30 of the present invention is installed on a substrate 54 of the personal computer in which a CPU 53 is mounted. The interface circuit 55 is connected with the CPU 53 through a bus 56.

Connection between the interface circuit 55 and the connecting apparatus 30 connects with the connecting wiring 59 as shown, for example, in FIG. 14B between the connecting apparatus side connector 56 of the interface circuit 55 and the connector 51 of the connecting apparatus. In this case, it is preferable to reduce the number of the connecting wiring 59 and bundle them into one by using the power source and the ground wiring commonly, for example. The PC side of the interface circuit 55 is made correspond to the bus 56 such as ISA, PCI, USB, IEEE1394 or the like, whereas the connecting apparatus 30 side is so constructed as to drive both the smart card 11 and the memory card 21 in parallel. A two-piece type connector or an edge type connector may be used as the connector 51 of the connecting apparatus 30.

Figure 16:
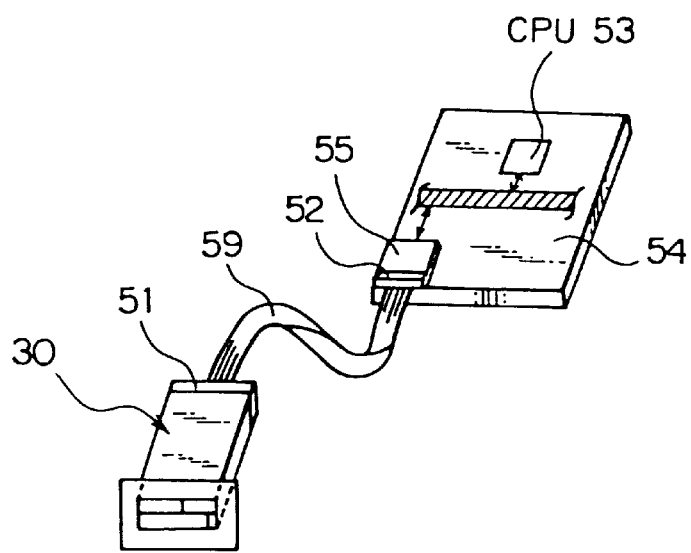
FIG. 16 is a view showing the construction of an information processing apparatus of the present invention in which a connector composed of a small number of pins installed on a main board of a personal computer is connected with a connector of the connecting apparatus through bundled connected wiring.

FIG. 16 is a view showing the construction of an information processing apparatus of the present invention in which a connector 52b composed of a small number of pins installed on a main board 54 of the personal computer is connected with the connector 51 of the connecting apparatus 30 to bundle in one connection wiring 59. According to the present invention, it is possible to drive in parallel a plurality of IC cards having different shapes and specifications by means of a common interface.

A firmware of the MPU 13 contained in the smart card 11 is capable of controlling the data memory EEPROM 16 mounted in the smart card though its memory size is different. It is preferable that the interface circuit 55 controls the difference in the memory capacity of the memory card 21, the supply voltage thereof, and the kind thereof in a software manner or a hardware manner or a driver software contained in the personal computer or the like controls them.

Figure 17:
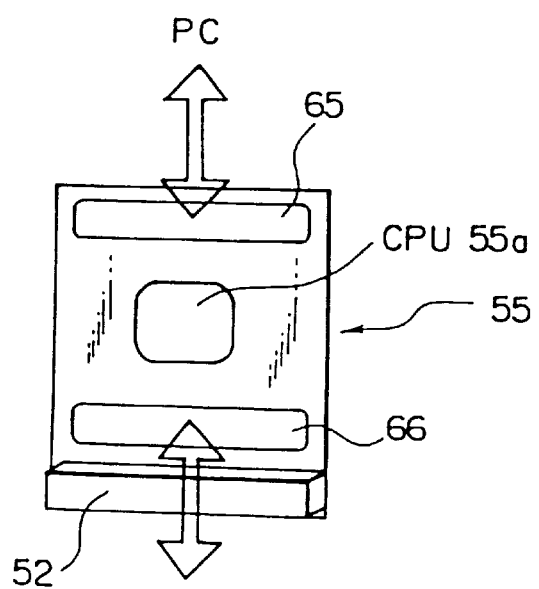
FIG. 17 is a view showing the construction of an interface circuit.
Figure 18:
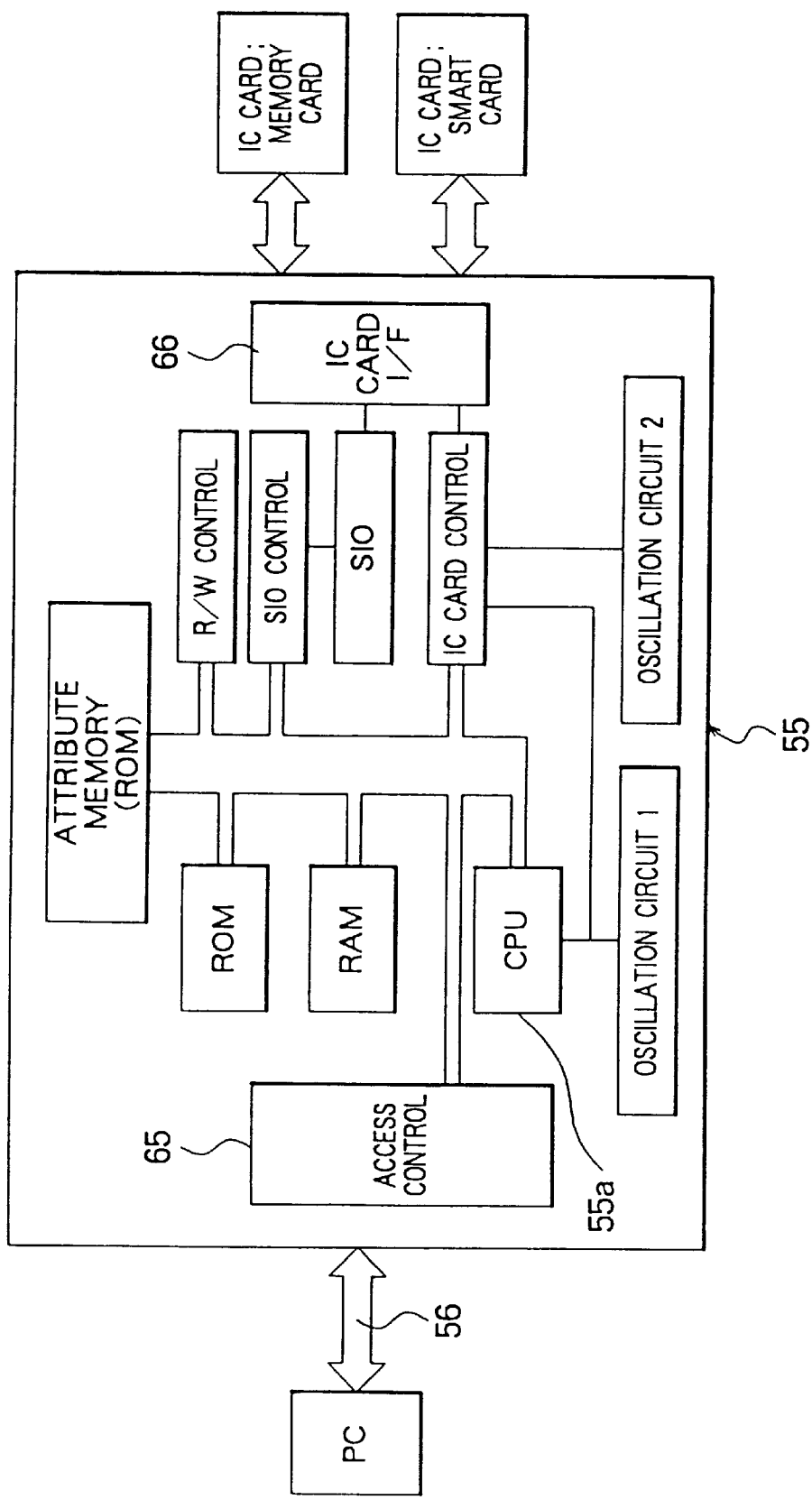
FIG. 18 is a block diagram schematically showing the construction of the interface circuit.
Figure 19:
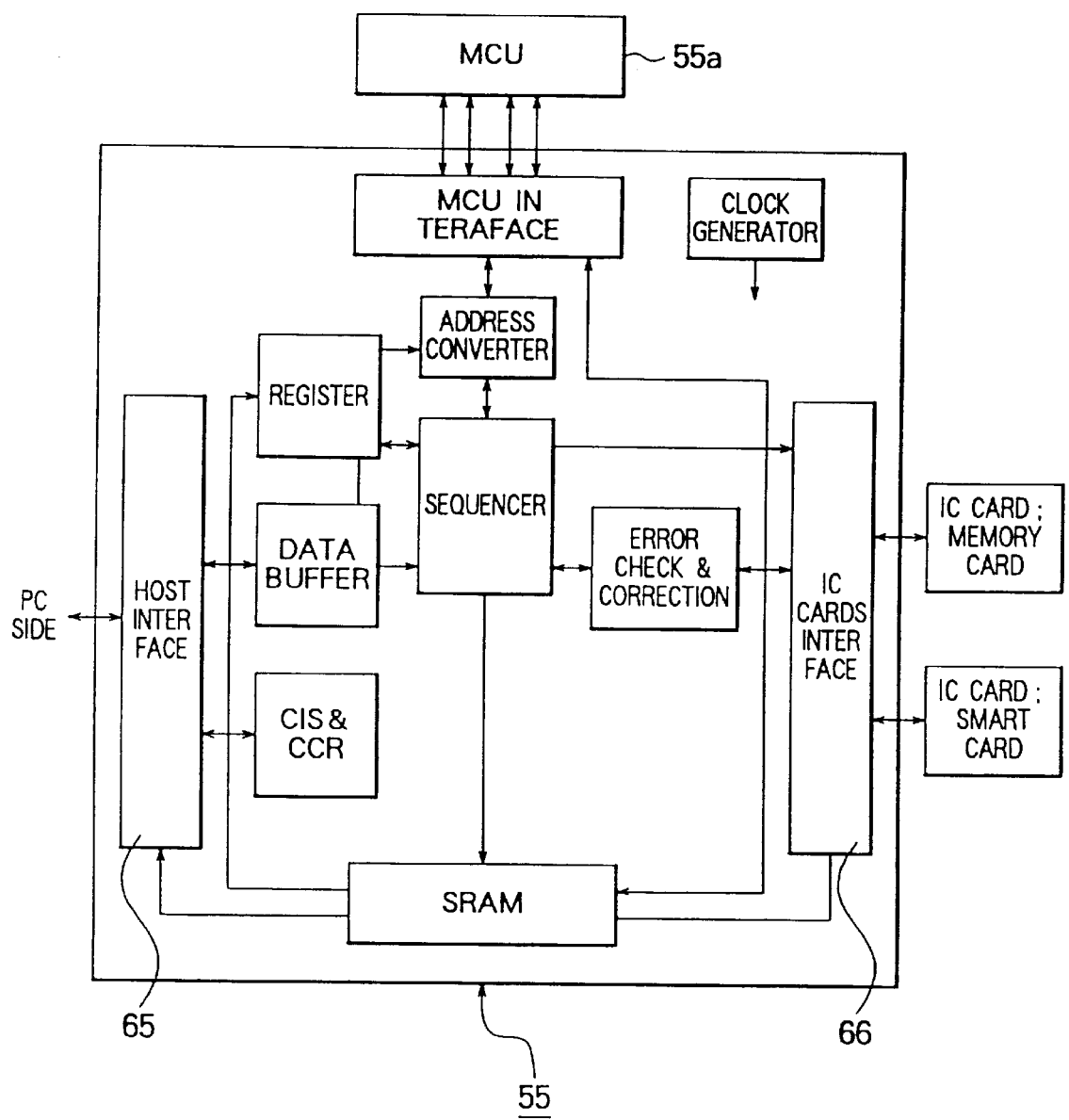
FIG. 19 is a block diagram schematically showing the construction of the interface circuit.

FIG. 17 is a view schematically showing the construction of the interface circuit 55. FIG. 18 and FIG. 19 are block diagrams schematically showing the construction of the interface circuit 55.

As shown in FIG. 17, at least one CPU (or DSP) 55a is provided in the interface circuit 55 to allow the CPU 55a to execute decoding and encoding of data, for example. The IC contained in the smart card 11 has also a CPU. Thus, the CPU of the IC of the smart card 11 may hold a small sized key, and the CPU of the interface circuit 55 may process the public key encoding/decoding. Further, security can be guaranteed for data held by the memory card 21 as follows. That is, in holding digital information such as photographs, fingerprints, voiceprints, and the like which are used for authentication in the memory card 21 and reading it therefrom, decoding and encoding of data is executed by the CPU 55a of the interface circuit 55 or the CPU of the smart card 11. The CPU 55a having a high processing performance is capable of executing complicated decoding and encoding processing in a short period of time. A load is increasingly applied to the CPU, as the value of a key of RSA becomes greater in bit length. Accordingly, to execute such a complicated processing by the CPU of the smart card, it is necessary to take a measure of providing a dedicated processor or the like to save time. Thus, according to the present invention, the CPU of the interface circuit 55 executes such a "heavy" processing. For example, according to the present invention, a high-performance CPU of 16 bits or 32 bits can be used properly, depending on necessity.

In the case of data not required to be decoded or encrypted, it is possible to design the interface circuit 55 such that access can be made between the memory card 21 and the host side through path. For example, a header indicating whether or not data held by the memory card 21 has been decoded may be attached to the data. The CPU of the smart card 11 can execute the attachment of the header.

Having the above-described construction, the connecting apparatus and the information processing apparatus of the present invention can improve security for electronic settlements or accounts and digital money. In particular, the connecting apparatus and the information processing apparatus can safely store data of digital sign, medical record, and the like, the information amount of which is as great as 1 MB–16 MB or more which exceeds the capacity of the smart card and can output the data to the personal computer side or the network side safely.

Embodiment 3

Figure 20:
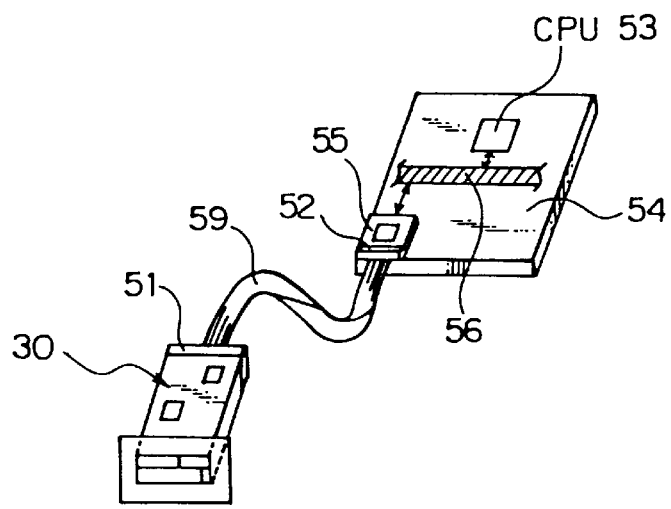
FIG. 20 is a view for describing another example of the information processing apparatus of the present invention.

FIG. 20 is a view for describing another example of the information processing apparatus of the present invention.

Figure 21:
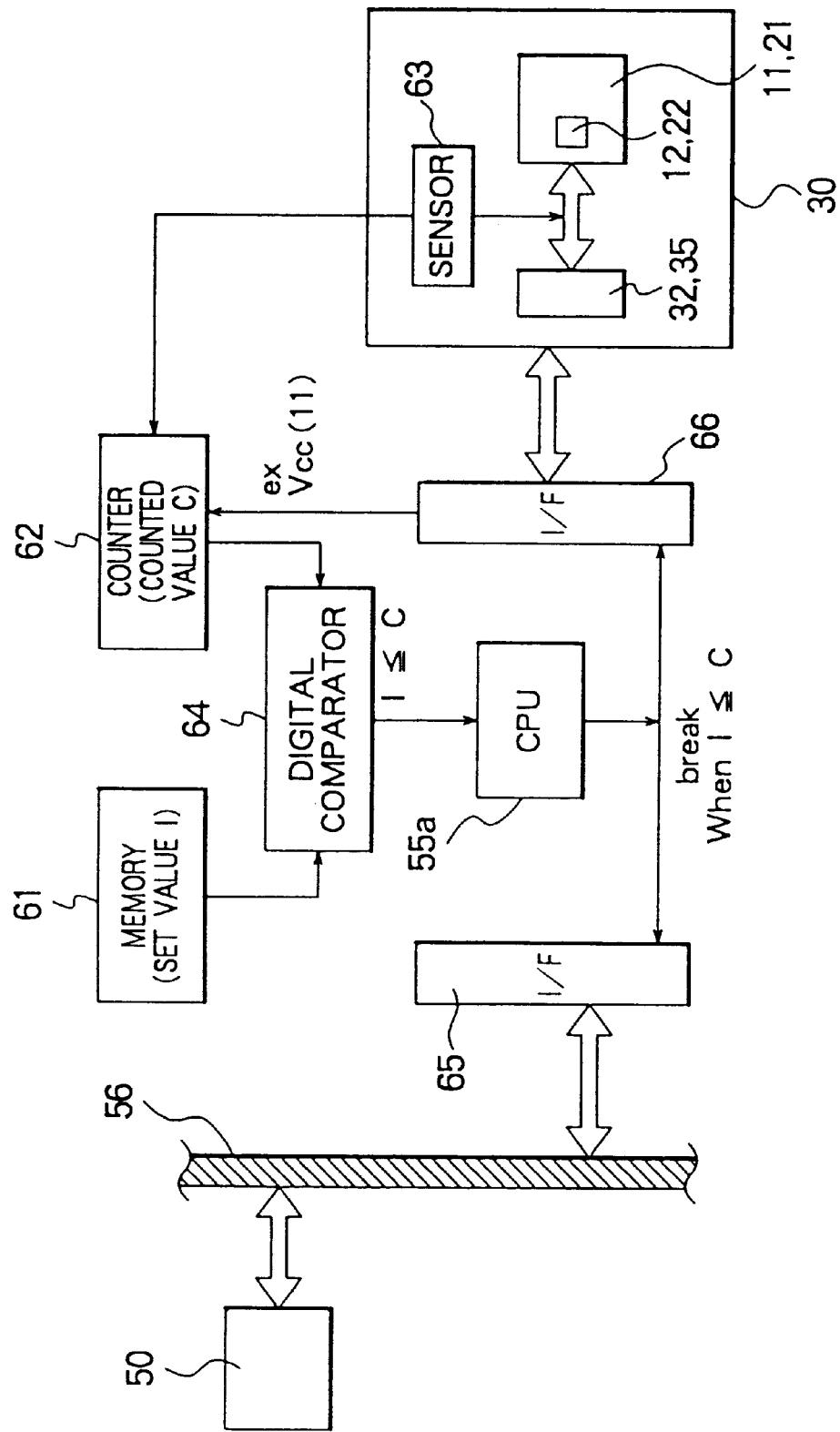
FIG. 21 is a view schematically showing the construction of an interface circuit having a counter and a comparator.

FIG. 21 is a view schematically showing the construction of the interface circuit 55 of the information processing apparatus.

The information processing apparatus comprises a memory 61 storing a predetermined value I as the number of times of contact between the connecting electrode 32 and the flat type connecting terminal 12 of the smart end 11 to secure the reliability of the connecting electrodes 32 and 35 of the connecting apparatus; a counter 62 for counting the number of times of the contact between the connecting electrode 32 and the flat type connecting terminal 12 of the IC card; and a means for comparing the predetermined value I stored by the memory 61 with a value C counted by the counter 62 and stopping input/output of signals to/from the smart card 11 when the counted value C has reached the predetermined value I. A digital comparator 64 executes a comparison between the predetermined value I and the counted value. If it is determined that C≧I, access to an I/F 65 of the personal computer side or access to an I/F 66 thereof at its IC card side is stopped, based on a signal outputted to the CPU 55a from the digital comparator 64.

The number of times of the contact between the connecting electrode 32 and the flat type connecting terminal 12 of the IC card may be counted by the VCC of the smart card side I/F of the interface circuit 55. Instead, a sensor 63 may be provided on the slot 31 of the connecting apparatus 30 to count number of times of insertion of the smart card 11 into the slot 31. Although description is given to a smart card 11, which is the first IC card, this method is applicable to the memory card 21, which is also received by the connecting apparatus as the second IC card.

Further, the first connecting means 33 and the second connecting means 36 of the connecting apparatus 30 may be so formed that at least the connecting electrodes 32 and 35 are exchangeable with each other. In this case, when the connecting electrodes 32 and 35 are exchanged with each other, a value counted by the counter 63 is reset. In addition, it is possible to form the first slot 31 and the second slot 34 as cartridges to the first holding means 33 and the second holding means 36 so that the two cartridges can be exchanged with each other.

Furthermore, it is very safe to provide the cartridge composed of the connecting electrode and the slot with a construction of preventing the cartridge from functioning as soon as it is removed from the first connecting means or the second connecting means. For example, the cartridge may be provided with a mechanism of destroying it electrically or mechanically immediately after it is removed from the first connecting means or the second connecting means or closing the opening of the slot.

The above description is concerned with an example of the connecting apparatus of the present invention which is used by containing it inside a casing of an information processing apparatus of the present invention such as a personal computer. In addition, it is possible to use the connecting apparatus by positioning it outside the casing of the information processing apparatus.

Figure 22:
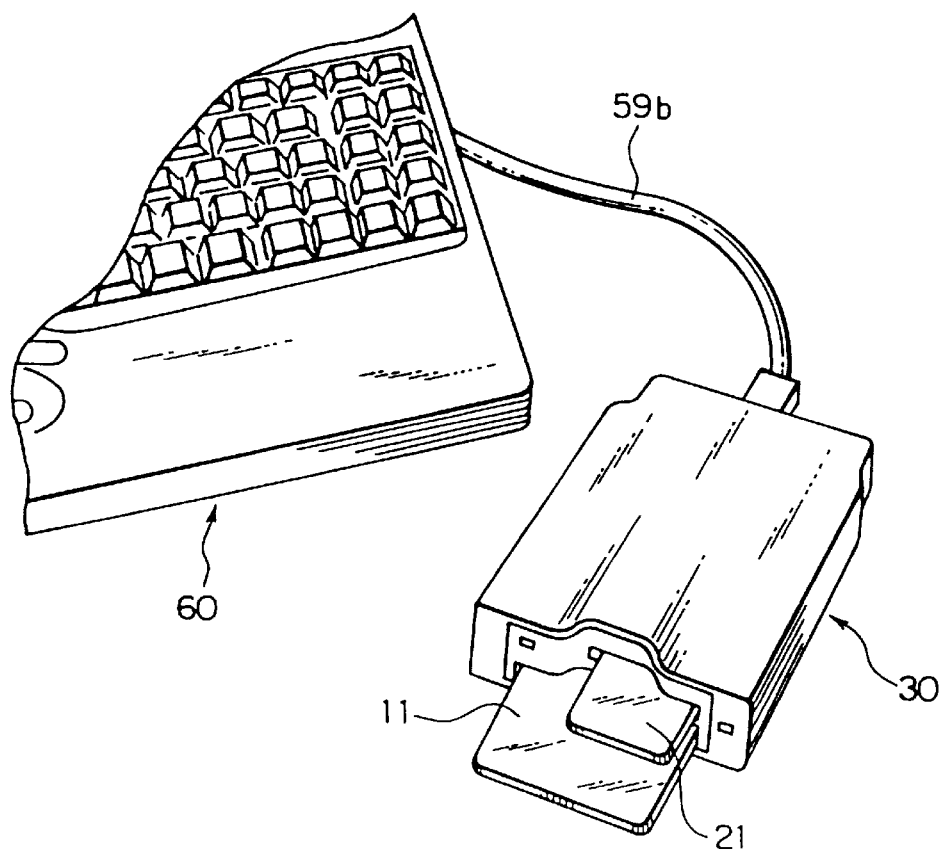
FIG. 22 is a view for describing another example of the use mode of the connecting apparatus of the present invention.

FIG. 22 is a view for describing a state in which the connecting apparatus of the present invention is used by connecting it with a handy type personal computer. The connecting apparatus 30, which is driven by receiving the smart card 11 and the memory card 21, is connected with a bus such as USB or IEEE1394 of the lap-top personal computer with the connection wire 59b. Although the interface circuit 55 is provided inside the connecting apparatus 30, it may be provided in the personal computer. Needless to say, the connecting apparatus of the present invention can be used by loading into the handy type personal computer because it is very thin.

Embodiment 4

As described above, the electronic business transaction system, the electronic banking system, and the electronic money system can be efficiently utilized in combination of the connecting apparatus of the present invention or the information processing apparatus thereof and a plurality of IC cards, for example, the smart card and the memory card.

In such a case, the security of the system can be enhanced by using encrypted identification data held in the memory card for authentication and using the smart card serving as a means for payment, in combination with the memory card.

As the identification data, image data such as a fingerprint, a photograph of a face, the iris; voice data; and a combination thereof may be used. It is preferable that the identification data is encrypted as a digital sign to authenticate individuals. For example, the identification data may be encrypted by a CPU of an interface to store the encrypted identification data in the memory card. Further, when the identification data is encrypted by an external interface, the encoding may be executed, based on a value of a key held in the smart card.

As an example of such a system, music distribution and payment which are executed by using two IC cards is described below. That is, music is distributed to users by using various networks and the data of the distributed music is stored in the memory card (for example, second IC card). Using the IC card makes the payment and settlement of accounts for the music distribution (for example, first IC card). Because the data of music, image, and video is suitable for serial access, it is appropriate to hold it in the IC card having the flat type connecting terminal and a serial access type memory element.

It is preferable to distribute the data of music by compressing it by using the compression algorithm such as AAC, AC-3 or the like to prevent traffic congestion and improve communication speed. Storing the data of music in a compressed state therein can save the capacity of the memory card. The memory card may hold the data of music by encrypting it. The music data itself may be encrypted. The encrypted music data stored in the music data may be held in the memory card.

Music can be distributed to users through various kinds of networks such as the Internet and the processing of the payment for the distribution of the music can be accomplished by using such a music distribution system.

The distribution system of music data has been described above as an example of file data. In addition, the file data is applicable to distribution systems such as text data distribution system, image data distribution system, video data distribution system (moving data such as MPEG, MPEG2), and the like.

As described above, according to the connecting apparatus of the present invention and the information processing apparatus thereof, a plurality of IC cards including the smart card and the memory card can be utilized in combination of a personal computer, and EWS or the like through slots permitting the insertion of the IC cards therein and removal of the IC cards therefrom in an electrically active state. Further, according to the connecting apparatus of the present invention and the information processing apparatus thereof, a plurality of IC cards can be driven in parallel by a common interface. Accordingly, electronic business transactions such as electronic settlements of accounts, electronic money, and the like can be accomplished safely and easily by utilizing existing infrastructures such as the personal computer. Furthermore, the personal computer, the FES, and the like can by utilized as interactive terminals in making electronic business transactions such as electronic settlements of accounts, electronic money, and the like. In addition, the connecting apparatus of the present invention and the information processing apparatus thereof provide a higher degree of security for data by providing at least one CPU in an interface circuit provided between the personal computer and the connecting apparatus apparatus.

Moreover, the connecting apparatus of the present invention is capable of compactly holding and driving a plurality of IC cards having different sizes, thus greatly improving the numbers of degrees of freedom in designing the information processing apparatus. Further, the connecting apparatus can be preferably applied to a portable information processing apparatus.

The information processing apparatus of the present invention is capable of always maintaining reliability of the connecting electrode which is connected with the flat type connecting terminal of the IC card, thus improving its reliability.

What is claimed is:

1. A method of electrical payment through a first integrated circuit (IC) card using an external card-reader having a first slot for receiving the first IC card and a second slot for receiving a second IC card different from the first IC card, the method comprising the steps of:

allowing a user to insert the first IC card into the first slot;

allowing the user to insert the second IC card into the second slot;

attempting to authenticate an identity of the user by using encrypted identification data stored in the second IC card;

processing payment from the user through the first IC card in response to a valid authentication; and sending information for storage on the second IC card.

2. A method of allowing a user to download digital content data by using an external card-reader having a first slot for receiving a first integrated circuit (IC) card and a second slot for receiving a second IC card different from the first IC card, the method comprising the steps of:

allowing the user to insert the first IC card into the first slot;

allowing the user to insert the second IC card into the second slot;

processing payment for the digital content data through the first IC card; and sending the digital content data to the second IC card after the payment is processed.

3. A method of electrical payment through a first integrated circuit (IC) card using an external card-reader having a first slot for receiving the first IC card and a second slot for receiving a second IC card different from the first IC card, the method comprising the steps of:

allowing insertion of the first IC card into the first slot;

allowing insertion of the second IC card into the second slot;

reading account data stored in the first IC card;

authenticating encrypted identification data stored in the second IC card;

processing a payment through the first IC card in response to the authentication of the encrypted identification data stored in the second IC card; and writing renewed account data into the first IC card.

4. The method of claim 3, wherein the first IC card is a smart card.

5. The method of claim 3, wherein the first IC card includes a central processing unit.

6. The method of claim 3, wherein the second IC card is a memory card.

7. The method of claim 3, wherein the second IC card comprises:

a flat type connection terminal; and at least one serial access memory element.

8. A method of downloading digital content data using an external card-reader having a first slot for receiving a first integrated circuit (IC) card and a second slot for receiving a second IC card different from the first IC card, the method comprising the steps of:

inserting the first IC card into the first slot;

inserting the second IC card into the second slot;

reading account data stored in the first IC card;

authenticating encrypted identification data stored in the second IC card;

processing a payment through the first IC card in response to a valid authentication of the encrypted identification data stored in the second IC card;

writing renewed account data into the first IC card; and writing the digital content data into the second IC card.

9. The method of claim 8, wherein the digital content data comprises at least one of music data, video data, and image data.

10. The method of claim 8, wherein the digital content data is compressed before it is written into the second IC card.

11. The method of claim 8, wherein the first IC card is a smart card.

12. The method of claim 8, wherein the first IC card includes a central processing unit.

13. The method of claim 8, wherein the second IC card is a memory card.

14. The method of claim 8, wherein the second IC card comprises:

a flat type connection terminal; and at least one serial access memory element.

15. A connecting apparatus for connecting a first IC card having a first face and a first flat type connecting terminal located on the first face and a second IC card having a first face and a second flat type connecting terminal located on the first face, wherein the second IC card is smaller than the first IC card, the connecting apparatus comprising:

a first slot capable of holding the first IC card;

a first connecting electrode capable of contacting the first flat type terminal when the first IC card is inserted into the first slot;

a second slot capable of holding the second IC card; and a second connecting electrode capable of contacting the second flat type terminal when the second IC card is inserted into the second slot.

16. The connecting apparatus as set forth in claim 15, wherein the second connecting electrode is formed to expose a region of the first connecting electrode.

17. The connecting apparatus as set forth in claim 16, wherein the first connecting electrode and the second connecting electrode are formed on the same sides, respectively, of the first and second slots.

18. The connecting apparatus as set forth in claim 15, wherein the first slot and the second slot are situated so that an insertion direction of the first IC card and an insertion direction of the second IC card are substantially the same.

19. The connecting apparatus as set forth in claim 15, wherein an opening of the first slot and an opening of the second slot are substantially coplanar.

20. The connecting apparatus as set forth in claim 15, wherein the first slot and the second slot are situated so that the first IC card and the second IC card overlap and so that first ends of the first and second IC cards coincide with each other.

21. The connecting apparatus as set forth in claim 15, wherein the first IC card complies with ISO7810, and an area of the second IC card is not greater than an area of the first IC card.

22. The connecting apparatus as set forth in claim 15, wherein the first IC card has a central processing unit (CPU) and the second IC card is a memory card.

23. The connecting apparatus as set forth in claim 15, wherein the second IC card has a thickness in compliance with ISO7810.

24. The connecting apparatus as set forth in claim 15, wherein the second IC card complies with JEDEC MO-186.

25. The connecting apparatus as set forth in claim 15, wherein the second IC card comprises a serial access type memory element connected with the second flat type connecting terminal.

26. The connecting apparatus as set forth in claim 25, wherein the serial access type memory element is one of a NAND type flash memory and an AND type flash memory.

27. The connecting apparatus as set forth in claim 15, further comprising interface circuitry operatively connecting the first connecting electrode to the second connecting electrode and driving the first IC card and the second IC card in parallel.

28. The connecting apparatus as set forth in claim 27, wherein the interface circuitry is formed on an exposed region adjacent to the second connecting electrode.

29. The connecting apparatus as set forth in claim 27, wherein the interface circuitry comprises at least a central processing unit (CPU).

30. The connecting apparatus as set forth in claim 27, wherein the interface circuitry comprises circuitry that decodes and encodes data input to and output from one or both of the first IC card and the second IC card.

31. The connecting apparatus as set forth in claim 15, further comprising a connector that connects an external circuit with the first connecting electrode and the second connecting electrode.

32. The connecting apparatus as set forth in claim 31, wherein the connector is a two-piece type connector.

33. The connecting apparatus as set forth in claim 31, wherein the connector is an edge-type connector.

34. An information processing apparatus for driving a first IC card having a first flat type connecting terminal on a first face thereof and a second IC card having a second flat type connecting terminal on a first face thereof, wherein the second IC card is smaller than the first IC card, the information processing apparatus comprising an interface circuit capable of driving in parallel the first IC card through the first flat type connecting terminal and the second IC card through the second flat type connecting terminal.

35. The information processing apparatus as set forth in claim 34, wherein the interface circuit comprises at least a central processing unit (CPU).

36. The information processing apparatus as set forth in claim 34, wherein the interface circuit decodes and encodes data input to and output from one or both of the first IC card and the second IC card.

37. The information processing apparatus as set forth in claim 34, wherein the first IC card comprises circuitry that decodes and encoding data input or output from one or both of the first IC card and the second IC card and wherein the interface circuit decodes and encodes data input to an output from one or both of the first IC card and the second IC card.

38. The information processing apparatus as set forth in claim 34, wherein the first IC card comprises circuitry that DES-decodes and DES-codes data input or output from one or both of the first IC card and the second IC card and wherein the interface circuitry RSA-decodes and RSA-codes data input to and output from one or both of the first IC card and the second IC card.

39. The information processing apparatus as set forth in claim 34, wherein the interface circuitry comprises a waveform shaping circuit.

40. The information processing apparatus as set forth in claim 39, wherein the waveform shaping circuit is a Schmitt trigger circuit.

41. An information processing apparatus comprising:
   a casing;
   a substrate accommodated in the casing and having a central processing unit (CPU) mounted thereon;
   connecting apparatus comprising
      a first slot into which a first integrated circuit (IC) card can be inserted, the first IC card comprising a first flat type connecting terminal,
      a second slot into which a second IC card can be inserted, the second IC card comprising a second flat type connecting terminal,
      a first connecting electrode capable of contacting the first flat type connecting terminal, and
      a second connecting electrode capable of contacting the second flat type connecting terminal;
   interface circuitry on the substrate capable of operatively connecting the first IC card and the second IC card and of controlling in parallel signals transmitted between the CPU and the first IC card and the second IC card; and
   wiring connecting the interface circuitry with the first connecting electrode and the second connecting electrode.

42. The information processing apparatus as set forth in claim 41, wherein the interface circuitry comprises a CPU.

43. The information processing apparatus as set forth in claim 41, wherein the interface circuitry decodes and encodes data input to and output from one or both of the first IC card and the second IC card.

44. The information processing apparatus as set forth in claim 41, further comprising common connection wiring connecting the interface circuitry with at least one of a power supply terminal and a ground terminal of the first connecting electrode and the second connecting electrode.

45. The information processing apparatus as set forth in claim 41, wherein the interface circuitry is mounted on the substrate and comprises a waveform shaping circuit.

46. The information processing apparatus as set forth in claim 45, wherein the waveform shaping circuit is a Schmitt trigger circuit.

47. An information processing apparatus, comprising
   connecting apparatus comprising:
      a slot capable of receiving an integrated circuit (IC) card, the IC card including a flat type connection terminal,
      a connecting electrode capable of contacting the flat type connecting terminal, and interface circuitry capable of accessing the IC card through the connecting electrode and the flat type connection terminal, wherein the interface circuitry comprises a counter that counts a number of times of contact between the connecting electrode and the flat type connecting terminal and circuitry comparing a predetermined value with the number of times of contact and stopping access to the IC card when the counted value reaches the predetermined value.

48. The information processing apparatus as set forth in claim 47, wherein the connecting electrode is exchangeably formed and wherein the interface circuitry resets a counter value when the connecting electrode is exchanged.

49. The information processing apparatus as set forth in claim 47, wherein the connecting electrode discriminates an unused state and a used state from each other and wherein a value counted by the counter is reset only when the connecting electrode in the unused state is exchanged.

50. An information processing apparatus capable of holding an inserted integrated circuit (IC) card having a first flat type connecting terminal on a first face, and an inserted second IC card having a second flat type connecting terminal on a first face, wherein the second IC card is smaller than the first IC card, the information processing apparatus comprising:

first connecting apparatus comprising a slot into which the first IC card is inserted and a first connecting electrode which is formed to contact the first flat type connecting terminal when the first IC card is inserted into the first slot; and a second connecting apparatus comprising a slot into which the second IC card is inserted and a second connecting electrode which is formed to contact the second flat type connecting terminal when the second IC card is inserted into the second slot.

* * * * *

UNITED STATES PATENT AND TRADEMARK OFFICE
CERTIFICATE OF CORRECTION

PATENT NO.: 6,137,710

DATED: October 24, 2000

INVENTOR(S): Iwasaki et al.

It is certified that an error appears in the above-identified patent and that said Letters Patent is hereby corrected as shown below:

Title page, Item [57], in the Abstract, line 2, change "IC, cards" to --IC cards--.

* Claim 37, column 20, line 5, change "an output" to --and output--.

Signed and Sealed this

Fifteenth Day of May, 2001

*Attest:*

NICHOLAS P. GODICI

*Attesting Officer*   Acting Director of the United States Patent and Trademark Office